United States Patent
Anzai et al.

(10) Patent No.: US 12,072,597 B2
(45) Date of Patent: Aug. 27, 2024

(54) REFLECTION FILM, WINDSHIELD GLASS, AND HEAD-UP DISPLAY SYSTEM

(71) Applicant: FUJIFILM Corporation, Tokyo (JP)

(72) Inventors: Akihiro Anzai, Minamiashigara (JP); Shusuke Arita, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/331,282

(22) Filed: Jun. 8, 2023

(65) Prior Publication Data
US 2023/0314669 A1 Oct. 5, 2023

Related U.S. Application Data

(63) Continuation of application No. PCT/JP2021/039801, filed on Oct. 28, 2021.

(30) Foreign Application Priority Data

Dec. 9, 2020 (JP) ................................. 2020-204144

(51) Int. Cl.
G02F 1/137 (2006.01)
G02F 1/13 (2006.01)
(Continued)

(52) U.S. Cl.
CPC ............ *G02F 1/13718* (2013.01); *G02F 1/13* (2013.01); *G02F 1/13363* (2013.01);
(Continued)

(58) Field of Classification Search
None
See application file for complete search history.

(56) References Cited

U.S. PATENT DOCUMENTS

2016/0085102 A1* 3/2016 Ohmuro .............. G02F 1/13363
  349/61
2017/0235030 A1 8/2017 Tanaka et al.
(Continued)

FOREIGN PATENT DOCUMENTS

CN 107272105 A 10/2017
JP 2019-59904 A 4/2019
(Continued)

OTHER PUBLICATIONS

International Preliminary Report on Patentability and Written Opinion of the International Searching Authority for International Application No. PCT/JP2021/039801, dated Jun. 22, 2023, with an English translation.
(Continued)

*Primary Examiner* — Dung T Nguyen
(74) *Attorney, Agent, or Firm* — Birch, Stewart, Kolasch & Birch, LLP

(57) ABSTRACT

Provided are a reflection film, which enables high visible light transmittance, an increase in the brightness of a display image, and favorable transparency of an external tint, a windshield glass, and a head-up display system. The reflection film includes a selective reflection layer formed of a cholesteric liquid crystal layer with a cholesteric liquid crystalline phase immobilized. In each of a wavelength range of 400 nm or more and less than 500 nm and a wavelength range of 500 nm or more and less than 600 nm, a maximum value of a natural light reflectivity is 10% to 25%, the greatest difference between the greatest maximum value and the smallest minimum value of the natural light reflectivity is 3% or more, and a total value of wavelength bandwidths in a region where a reflectivity is higher than an average value of the maximum value and the minimum value of the natural light reflectivity is 20 nm to 80 nm. In a wavelength range of 600 nm or more and 800 nm or less,
(Continued)

a maximum value of a natural light reflectivity is 10% to 25%, and a total value of wavelength bandwidths in a region where a reflectivity is higher than an average value of the maximum value and the minimum value of the natural light reflectivity is 120 nm or more.

20 Claims, 3 Drawing Sheets

(51) Int. Cl.

| | |
|---|---|
| *G02F 1/13363* | (2006.01) |
| *G02F 1/1337* | (2006.01) |
| *G02F 1/1347* | (2006.01) |
| *B32B 17/06* | (2006.01) |
| *B60J 1/00* | (2006.01) |
| *B60J 1/02* | (2006.01) |
| *B60J 3/00* | (2006.01) |
| *B60K 35/00* | (2006.01) |
| *B60K 35/23* | (2024.01) |
| *B60K 35/60* | (2024.01) |
| *G02B 5/08* | (2006.01) |
| *G02B 5/20* | (2006.01) |
| *G02B 27/01* | (2006.01) |
| *G02B 27/28* | (2006.01) |

(52) U.S. Cl.
CPC .......... *G02F 1/1337* (2013.01); *G02F 1/1347* (2013.01); *B32B 17/06* (2013.01); *B32B 2307/412* (2013.01); *B32B 2307/416* (2013.01); *B32B 2307/42* (2013.01); *B32B 2307/7376* (2023.05); *B32B 2605/00* (2013.01); *B60J 1/001* (2013.01); *B60J 1/02* (2013.01); *B60J 3/007* (2013.01); *B60K 35/00* (2013.01); *B60K 35/23* (2024.01); *B60K 35/60* (2024.01); *B60K 2360/23* (2024.01); *B60K 2360/785* (2024.01); *G02B 5/0816* (2013.01); *G02B 5/208* (2013.01); *G02B 27/0101* (2013.01); *G02B 2027/0118* (2013.01); *G02B 27/286* (2013.01)

(56) References Cited

U.S. PATENT DOCUMENTS

| | | |
|---|---|---|
| 2020/0055400 A1 | 2/2020 | Edmonds et al. |
| 2020/0326539 A1 | 10/2020 | Ando et al. |
| 2021/0263314 A1 | 8/2021 | Anzai et al. |
| 2021/0294099 A1 | 9/2021 | Anzai et al. |
| 2022/0004028 A1 | 1/2022 | Hayasaki et al. |
| 2023/0035433 A1 | 2/2023 | Anzai |

FOREIGN PATENT DOCUMENTS

| | | |
|---|---|---|
| JP | 2020-511688 A | 4/2020 |
| WO | WO 2016/056617 A1 | 4/2016 |
| WO | WO 2019/146423 A1 | 8/2019 |
| WO | WO 2020/080355 A1 | 4/2020 |
| WO | WO 2020/122023 A1 | 6/2020 |
| WO | WO 2020/196449 A1 | 10/2020 |
| WO | WO 2021/200652 A1 | 10/2021 |

OTHER PUBLICATIONS

International Search Report for International Application No. PCT/JP2021/039801, dated Jan. 11, 2022, with an English translation.
Supplementary European Search Report issued May 21, 2024 for International Application No. PCT/JP2021/039801.

* cited by examiner

REFLECTION FILM, WINDSHIELD GLASS, AND HEAD-UP DISPLAY SYSTEM

CROSS-REFERENCE TO RELATED APPLICATIONS

This application is a Continuation of PCT International Application No. PCT/JP2021/039801 filed on Oct. 28, 2021, which claims priority under 35 U.S.C. § 119(a) to Japanese Patent Application No. 2020-204144 filed on Dec. 9, 2020. The above applications are hereby expressly incorporated by reference, in its entirety, into the present application.

BACKGROUND OF THE INVENTION

1. Field of the Invention

The present invention relates to a reflection film that can be used as a combiner of a head-up display system, a windshield glass including this reflection film, and a head-up display system.

2. Description of the Related Art

Recently, it is known as a so-called head-up display or head-up display system for providing various pieces of information such as maps, traveling speed, or vehicle conditions to a driver or the like by projecting images on a windshield glass of a vehicle or other moving objects.

By using the head-up display system, drivers or other subjects observe virtual images of images that are projected on the windshield glass and that include the above described various pieces of information. A virtual image formation position is positioned on the driver's field of the vehicle outer side of the windshield glass. The virtual image formation position is usually positioned at the driver's field more than 1000 mm away from the windshield glass, and the outer side of the windshield glass. Therefore, the driver can obtain the above described various pieces of information while looking at the outer side in driver's field without significantly moving his/her line of sight. Thus, in a case of using the head-up display system, it is expected to drive more safely while obtaining various pieces of information.

The head-up display system can be configured to form a reflection film on the windshield glass using a half-mirror film. Various half-mirror films that can be used in the head-up display system are proposed.

It is described in WO2016/056617A that a light reflection film includes at least two light reflection layers that are laminated, the at least two light reflection layers including at least one of light reflection layers among a light reflection layer PRL-1, a light reflection layer PRL-2 and a light reflection layer PRL-3, the light reflection layer PRL-1 having a central reflection wavelength of greater than or equal to 400 nm but less than 500 nm and a reflectivity to ordinary light at the central reflection wavelength of greater than or equal to 5% but less than or equal to 25%, the light reflection layer PRL-2 having a central reflection wavelength of greater than or equal to 500 nm but less than 600 nm and a reflectivity to ordinary light at the central reflection wavelength of greater than or equal to 5% but less than or equal to 25%, the light reflection layer PRL-3 having a central reflection wavelength of greater than or equal to 600 nm but less than 700 nm and a reflectivity to ordinary light at the central reflection wavelength of greater than or equal to 5% but less than or equal to 25%, the at least two light reflection layers having central reflection wavelengths that are different from each other, and all of the at least two light reflection layers that are laminated having a property of reflecting polarization that has the same orientation.

The light reflection film described in WO2016/056617A is incorporated in, for example, a windshield glass to form a head-up display system. The windshield glass (combiner) constituting the head-up display system is demanded to have a high visible light transmittance.

SUMMARY OF THE INVENTION

Here, an in-vehicle head-up display system is required to have transmittance of more than the transmittance set forth in legal regulations in Japan and the transparent external tint even viewed from various angles from the viewpoint of designability.

It has been conventionally considered to reduce the reflectivity to maintain a transmittance of 70% or more complying with the regulations and bring the external tint to be almost transparent. However, in a case where the reflectivity is lowered too much, the brightness of a display image (projection image) is lowered, and the visibility is deteriorated.

An object of the present invention is to provide a reflection film, which enables high visible light transmittance, an increase in the brightness of a display image, and favorable transparency of an external tint, a windshield glass formed with this reflection film, and a head-up display system.

[1] A reflection film comprising:
a selective reflection layer formed of a cholesteric liquid crystal layer with a cholesteric liquid crystalline phase immobilized,
in which the selective reflection layer satisfies all of requirements (i) to (iii),
  (i) in a wavelength range of 400 nm or more and less than 500 nm, a maximum value of a natural light reflectivity is 10% to 25%, a difference between a greatest maximum value and a smallest minimum value of the natural light reflectivity is 3% or more, and a total value of wavelength bandwidths in a region where a reflectivity is higher than an average value of the maximum value and the minimum value of the natural light reflectivity is 20 nm to 80 nm,
  (ii) in a wavelength range of 500 nm or more and less than 600 nm, a maximum value of a natural light reflectivity is 10% to 25%, a difference between a greatest maximum value and a smallest minimum value of the natural light reflectivity is 3% or more, and a total value of wavelength bandwidths in a region where a reflectivity is higher than an average value of the maximum value and the minimum value of the natural light reflectivity is 20 nm to 80 nm, and
  (iii) in a wavelength range of 600 nm or more and 800 nm or less, a maximum value of a natural light reflectivity is 10% to 25%, and a total value of wavelength bandwidths in a region where a reflectivity is higher than an average value of the maximum value and the minimum value of the natural light reflectivity is 120 nm or more.

[2] The reflection film according to [1],
in which the selective reflection layer includes two or more cholesteric liquid crystal layers having different selective reflection center wavelengths, and
the cholesteric liquid crystal layers are in contact with each other.

[3] The reflection film according to [1] or [2],
in which the selective reflection layer includes a cholesteric liquid crystal layer having two or more selective reflection center wavelengths.
[4] The reflection film according to any one of [1] to [3], in which a total thickness of the selective reflection layers is 0.4 μm to 2.0 μm.
[5] The reflection film according to any one of [1] to [4], in which the reflection film reflects linearly polarized light.
[6] The reflection film according to any one of [1] to [5], further comprising:
a retardation layer; and
a polarization conversion layer,
in which the retardation layer, the selective reflection layer, and the polarization conversion layer are arranged in this order.
[7] The reflection film according to [6],
in which the polarization conversion layer has a helical alignment structure of a liquid crystal compound, which is immobilized, and
the number of pitches x of the helical alignment structure in the polarization conversion layer and a film thickness y (μm) of the polarization conversion layer satisfy all of Expression (a) to Expression (c), $0.1 \leq x \leq 1.0$    Expression (a), $0.5 \leq y \leq 3.0$    Expression (b), $3000 \leq (1560xy)/x \leq 50000$    Expression (c).

[8] A windshield glass comprising, in the following order:
a first glass plate;
the reflection film according to any one of [1] to [7]; and
a second glass plate.
[9] The windshield glass according to [8],
in which each of the first glass plate and the second glass plate is curved glass, and
the reflection film and the second glass plate are provided on a convex side of the first glass plate.
[10] The windshield glass according to [9],
in which the reflection film includes a polarization conversion layer, and
the polarization conversion layer and the selective reflection layer are arranged in this order from the convex side of the first glass plate.
[11] The windshield glass according to [9] or [10],
in which the reflection film includes a retardation layer,
the retardation layer is arranged between the selective reflection layer and the second glass plate, and
the retardation layer has a front retardation of 50 nm to 160 nm at a wavelength of 550 nm, and has a slow axis at an angle of 10° to 50° or −50° to −10° in a case where a direction corresponding to an upper vertical direction of a surface of the first glass plate is set to 0°, with the windshield glass being mounted in a vehicle.
[12] The windshield glass according to any one of [9] to [11],
in which the reflection film includes a transparent substrate, and
the transparent substrate is arranged on the second glass plate side.
[13] The windshield glass according to [12],
in which the transparent substrate contains an ultraviolet absorber.
[14] The windshield glass according to any one of [8] to [13], further comprising an interlayer film between the first glass plate and the reflection film.

[15] The windshield glass according to any one of [8] to [14], further comprising a heat seal layer between the reflection film and the second glass plate.
[16] A head-up display system comprising:
the windshield glass according to any one of [9] to [15]; and
a projector that emits projection light onto the first glass plate side of the windshield glass.
[17] The head-up display system according to [16],
in which the projector emits p-polarized projection light.

According to the present invention, it is possible to provide a reflection film, which enables high visible light transmittance, an increase in the brightness of a display image, and favorable transparency of an external tint, a windshield glass, and a head-up display system.

DESCRIPTION OF THE PREFERRED EMBODIMENTS

Figure 1:
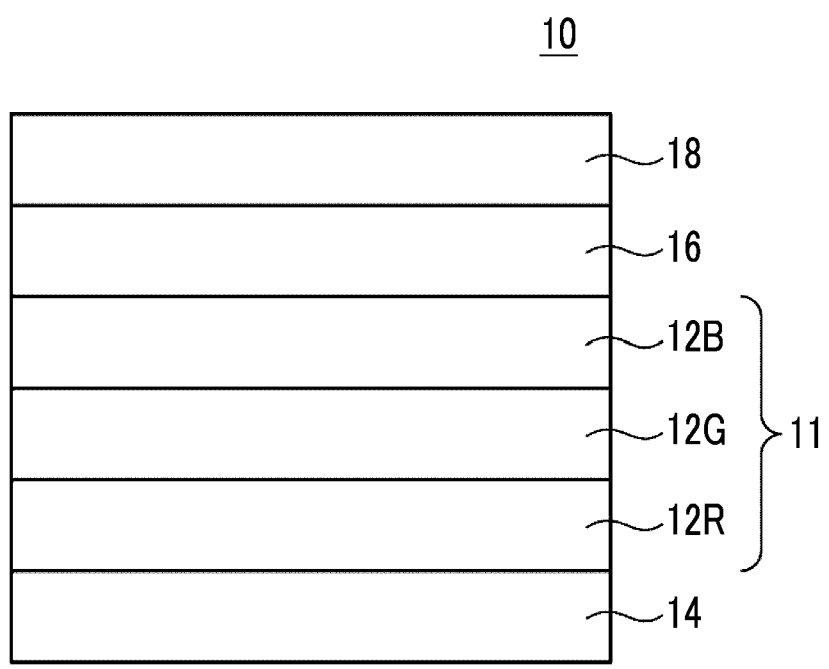
FIG. 1 is a schematic diagram illustrating an example of a reflection film of the present invention.

Hereinafter, a reflection film, a windshield glass, and a head-up display system according to an embodiment of the present invention will be described in detail based on preferred embodiments illustrated in the accompanying drawings.

The figures described below are exemplary for explaining the present invention, and the present invention is not limited to the figures illustrated below.

In the following, "to" indicating the numerical range includes the numerical values described on both sides. For example, $\varepsilon_1$ is the numerical value $\alpha_1$ to the numerical value $\beta_1$ means that the range of $\varepsilon_1$ includes the numerical value $\alpha_1$ and the numerical value $\beta_1$, and in a case of being indicated by mathematical signs, $\alpha_1 \leq \varepsilon_1 \leq \beta_1$.

Angles such as "angles represented by specific numerical values", "parallel", "vertical", and "orthogonal" include error ranges generally tolerated in the art, unless otherwise described.

The term "the same" includes an error range generally tolerated in the art, and an "entire surface" and the like also include error ranges generally tolerated in the art.

"light" means light of visible light and natural light (non-polarized light), unless otherwise specified. The visible light is light at a wavelength which is visible to the human eyes, among electromagnetic waves, and is normally light in a wavelength range of 380 to 780 nm. Invisible light is light in a wavelength range of less than 380 nm or in a wavelength range of more than 780 nm.

Although light is not limited to this, among the visible light, the light in a wavelength range of 420 to 490 nm is blue (B) light, the light in a wavelength range of 495 to 570 nm is green (G) light, and the light in a wavelength range of 620 to 750 nm is red (R) light.

The term "visible light transmittance" is a visible light transmittance of an A light source defined in JIS (Japanese Industrial Standards) R 3212:2015 (Test methods of safety glazing materials for road vehicles). That is, the light transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average.

In a case of simply referring to "reflected light" or "transmitted light", the "reflected light" and "transmitted light" include meanings of "scattered light" and "diffracted light", respectively.

p-polarized light means polarized light that vibrates in a direction parallel to a surface into which light is incident. The incident surface means a surface that is perpendicular to a reflecting surface (such as a surface of windshield glass) and that includes incident rays and reflected rays. A vibration surface of an electric field vector of the p-polarized light is parallel to the incident surface.

A front phase difference is a value measured with AxoScan manufactured by Axometrics, Inc. Unless otherwise specified, a measurement wavelength is set to 550 nm. Light that has wavelengths in a visible light wavelength range is allowed to be incident into the normal direction of a film and measured to obtain a value by using KOBRA 21ADH or WR (manufactured by Oji Scientific Instruments), and the value can also be used as the front phase difference. In a case of selecting a measurement wavelength, a wavelength selective filter can be manually exchanged, or a measurement value can be converted using a program or the like to perform the measurement.

The term "projection image" means an image based on projection of light from a projector to be used, which is not a scenery viewed from the driver's position such as the driver's field. The projection image is observed by an observer as a virtual image that appears over a reflection film of the windshield glass.

The term "screen image" means an image displayed on a drawing device of the projector or an image drawn on an intermediate image screen or the like by the drawing device. Unlike a virtual image, the screen image is a real image.

Both the screen image and the projection image may be monochrome images, may be multicolor images with two or more colors, or may be full color images.

[Reflection Film]

A reflection film according to an embodiment of the present invention includes a selective reflection layer formed of a cholesteric liquid crystal layer with a cholesteric liquid crystalline phase immobilized.

The selective reflection layer is a reflection film that satisfies all of the following requirements (i) to (iii).

(i) In a wavelength range of 400 nm or more and less than 500 nm, a maximum value of a natural light reflectivity is 10% to 25%, a difference between the greatest maximum value and the smallest minimum value of the natural light reflectivity is 3% or more, and a total value of wavelength bandwidths in a region where a reflectivity is higher than an average value of the maximum value and the minimum value of the natural light reflectivity is 20 nm to 80 nm.

(ii) In a wavelength range of 500 nm or more and less than 600 nm, a maximum value of a natural light reflectivity is 10% to 25%, a difference between the greatest maximum value and the smallest minimum value of the natural light reflectivity is 3% or more, and a total value of wavelength bandwidths in a region where a reflectivity is higher than an average value of the maximum value and the minimum value of the natural light reflectivity is 20 nm to 80 nm.

(iii) in a wavelength range of 600 nm or more and 800 nm or less, a maximum value of a natural light reflectivity is 10% to 25%, and a total value of wavelength bandwidths in a region where a reflectivity is higher than an average value of the maximum value and the minimum value of the natural light reflectivity is 120 nm or more.

FIG. 1 is a schematic diagram illustrating an example of a reflection film according to an embodiment of the present invention. A reflection film 10 illustrated in FIG. 1 includes a polarization conversion layer 14, a selective reflection layer 11, a retardation layer 16, and a transparent substrate 18, in this order.

The selective reflection layer 11 has three cholesteric liquid crystal layers (12R, 12G 12B). The three cholesteric liquid crystal layers have different selective reflection center wavelengths from one another. In an example illustrated in the figure, the selective reflection layer has, in the following order, the cholesteric liquid crystal layer 12R having a selective reflection center wavelength in the red wavelength range, the cholesteric liquid crystal layer 12G having a selective reflection center wavelength in the green wavelength range, and the cholesteric liquid crystal layer 12B having a selective reflection center wavelength in the blue wavelength range. In addition, in the example illustrated in the figure, individual cholesteric liquid crystal layers are in direct contact with any other cholesteric liquid crystal layers.

As is well known, a cholesteric liquid crystal layer is a layer composed of a liquid crystal compound in an alignment state of a helical structure in which a cholesteric liquid crystalline phase is immobilized, reflects light having a selective reflection center wavelength corresponding to a pitch of the helical structure, and transmits light in another wavelength range. In addition, the cholesteric liquid crystal layer exhibits selectively reflecting properties in response to either levorotatory circularly polarized light or dextrorotatory circularly polarized light at a specific wavelength.

Here, in the present invention, the selective reflection layer satisfies all of the following requirements (i) to (iii).

(i) In a wavelength range of 400 nm or more and less than 500 nm, a maximum value of a natural light reflectivity is 10% to 25%, a difference between the greatest maximum value and the smallest minimum value of the natural light reflectivity is 3% or more, and a total value of wavelength bandwidths in a region where a reflectivity is higher than an average value of the maximum value and the minimum value of the natural light reflectivity is 20 nm to 80 nm.

(ii) In a wavelength range of 500 nm or more and less than 600 nm, a maximum value of a natural light reflectivity is 10% to 25%, a difference between the greatest maximum value and the smallest minimum value of the natural light reflectivity is 3% or more, and a total value of wavelength bandwidths in a region where a reflectivity is higher than an average value of the maximum value and the minimum value of the natural light reflectivity is 20 nm to 80 nm.

(iii) in a wavelength range of 600 nm or more and 800 nm or less, a maximum value of a natural light reflectivity is 10% to 25%, and a total value of wavelength bandwidths in a region where a reflectivity is higher than an average value of the maximum value and the minimum value of the natural light reflectivity is 120 nm or more.

In the selective reflection layer including the cholesteric liquid crystal layer, the reflected wavelength and reflectivity can be adjusted according to a selective reflection center wavelength and a thickness (the number of helical pitches) of the cholesteric liquid crystal layer, and the like. In the example illustrated in FIG. 1, mainly, a reflection satisfying the requirement (i) is achieved by the cholesteric liquid crystal layer 12B that reflects light in the blue wavelength range, a reflection satisfying the requirement (ii) is achieved mainly by the cholesteric liquid crystal layer 12G that reflects light in the green wavelength range, and a reflection satisfying the requirement (iii) is achieved mainly by the cholesteric liquid crystal layer 12R that reflects light in the red wavelength range.

Figure 2:
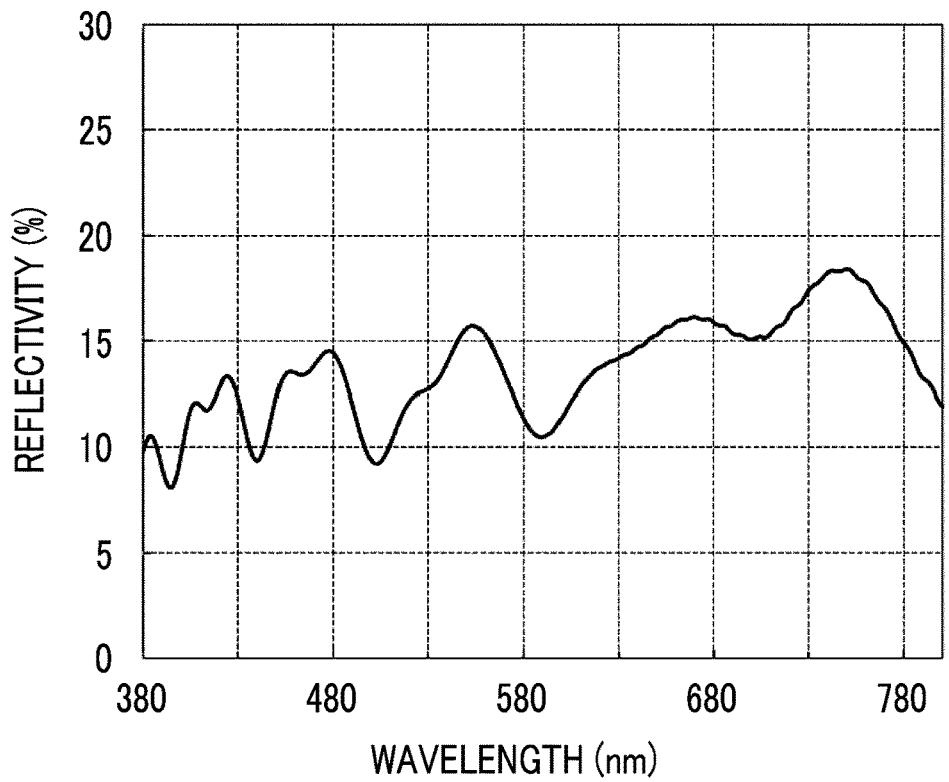
FIG. 2 is a graph illustrating a relationship between a wavelength and a transmittance.

An example of a natural light reflection spectrum that satisfies the above requirements (i) to (iii) is illustrated in FIG. 2. A graph illustrated in FIG. 2 is an example of a natural light reflection spectrum in the reflection film of Example 1 described later.

In the spectrum illustrated in the graph of FIG. 2, the natural light reflectivity has the maximum value (the greatest maximum value) in the vicinity of a wavelength of 480 nm in a range of a wavelength of 400 nm or more and less than 500 nm, and the value is about 14.5%, which is within a range of 10% to 25%. Furthermore, the natural light reflectivity has the smallest minimum value in the vicinity of a wavelength of 440 nm in a range of a wavelength of 400 nm or more and less than 500 nm, and the value is about 9.5%. Therefore, the difference between the greatest maximum value and the smallest minimum value of the natural light reflectivity is about 5%, which is 3% or more. Furthermore, the natural light reflectivity has the minimum value in the vicinity of a wavelength of 440 nm in a range of a wavelength of 400 nm or more and less than 500 nm, and the value is about 9.5%. Therefore, an average value between the maximum value and the minimum value of the natural light reflectivity is 12%. The wavelength bandwidths in a region where the natural light reflectivity is higher than 12% are approximately 415 nm to 430 nm and 445 nm to 490 nm, and a total value of the wavelength bandwidths is about 60 nm, which is within a range of 20 nm to 80 nm.

Therefore, the spectrum illustrated in the graph of FIG. 2 satisfies the requirement (i).

In the spectrum illustrated in the graph of FIG. 2, the natural light reflectivity has the maximum value (the greatest maximum value) in the vicinity of a wavelength of 555 nm in a range of a wavelength of 500 nm or more and less than 600 nm, and the value is about 15.5%, which is within a range of 10% to 25%. Furthermore, the natural light reflectivity has the smallest minimum value in the vicinity of a wavelength of 505 nm in a range of a wavelength of 500 nm or more and less than 600 nm, and the value is about 9%. Therefore, the difference between the greatest maximum value and the smallest minimum value of the natural light reflectivity is about 6.5%, which is 3% or more. Furthermore, the natural light reflectivity has the minimum value in the vicinity of a wavelength of 505 nm in a range of a wavelength of 500 nm or more and less than 600 nm, and the value is about 9%. Therefore, an average value between the maximum value and the minimum value of the natural light reflectivity is 12.3%. The wavelength bandwidths in a region where the natural light reflectivity is higher than 12.3% are approximately 520 nm to 575 nm, and a total value of the wavelength bandwidths is about 55 nm, which is within a range of 20 nm to 80 nm.

Therefore, the spectrum illustrated in the graph of FIG. 2 satisfies the requirement (ii).

In the spectrum illustrated in the graph of FIG. 2, the natural light reflectivity has the maximum value (the greatest maximum value) in the vicinity of a wavelength of 750 nm in a range of a wavelength of 600 nm or more and 800 nm or less, and the value is about 18.3%, which is within a range of 10% to 25%. Furthermore, the natural light reflectivity has the minimum value in the vicinity of a wavelength of 600 nm in a range of a wavelength of 600 nm or more and 800 nm or less, and the value is about 11.3%. Therefore, an average value between the maximum value and the minimum value of the natural light reflectivity is 14.8%. The wavelength bandwidths in a region where the natural light reflectivity is higher than 14.8% are approximately 650 nm to 780 nm, and a total value of the wavelength bandwidths is about 130 nm, which is within a range of 120 nm or more.

Therefore, the spectrum illustrated in the graph of FIG. 2 satisfies the requirement (iii).

As described above, an in-vehicle head-up display system is required to have a transmittance of more than the transmittance set forth in legal regulations in Japan and the transparent external tint even viewed from various angles from the viewpoint of designability. It has been conventionally considered to reduce the reflectivity to maintain a transmittance of 70% or more complying with the regulations and bring the external tint to be almost transparent (white). However, in a case where the reflectivity is lowered too much, the brightness of a display image (projection image) is lowered, and the visibility is deteriorated.

By contrast, in the reflection film according to the embodiment of the present invention, setting the maximum value of the natural light reflectivity having a wavelength of 500 nm or more and less than 600 nm within a range of 10% to 25% enables an improvement of the transparency of the tint. In order to ensure a front transmittance of 70% in accordance with the regulations, the reflectivity of the luminosity factor around 550 nm is crucial. Therefore, the transmittance can be ensured by setting the maximum value of the natural light reflectivity having a wavelength of 500 nm or more and less than 600 nm to 25% or less. Next, in order to increase the brightness, it is necessary that the reflectivity in the vicinity of 550 nm in an oblique direction (incident angle of 60°) is large. In the reflection film according to the embodiment of the present invention, satisfying the fact that the maximum value of the natural light reflectivity at a wavelength of 600 nm or more and 800 nm or less is 10% to 25%, and a width of the reflection band is 120 nm or more enables an improvement of the front brightness of a display image and an improvement of the transparency of the tint in a case where the reflection film is viewed from an oblique direction (incident angle of 60°). In addition, a reflection at a wavelength of 500 nm or more and less than 600 nm and only the reflection at a wavelength of 600 nm or more and 800 nm or less cause a reflection tint of the front surface to change from yellow to red. Therefore, in the reflection film according to the embodiment of the present invention, the maximum value of the natural light reflectivity is set to 10% to 25% at a wavelength of 400 nm or more and less than 500 nm, so that the transparency of the tint seen from the vicinity of the front surface (incident angle of 5°) can be improved. Furthermore, in each of the bands at a wavelength of 400 nm or more and less than 500 nm and a wavelength of 500 nm or more and less than 600 nm, the difference between the greatest maximum value and the smallest minimum value of the natural light reflectivity is set to 3% or more, and a total value of wavelength bandwidths in a region where a reflectivity is higher than the average value of the maximum value and the minimum value of the natural light reflectivity is set within 20 nm to 80 nm, that is, set to a narrow band, which enable the formation of a wavelength range in which the reflectivity is low in each of the bands at a wavelength of 400 nm or more and less than 500 nm and a wavelength of 500 nm or more and less than 600 nm. As a result, the transmittance is improved.

These effects can cause a natural light transmittance of 70% or more in the windshield glass in which the reflection film is sandwiched between green glasses (80% or more in a case where it is sandwiched between clear glasses). In addition, the reflectivity of the display image with respect to a wavelength of light can be set to 25% or more, and the brightness of the display image can be improved. In addition, it is possible to improve the transparency of the tint when viewed from various directions.

From the viewpoint that the transmittance can be increased while improving the reflection tint, the maximum value of the natural light reflectivity in a range of 400 nm or more and less than 500 nm is preferably 11% to 20%, and more preferably 12% to 20%.

Similarly, from the viewpoint that the transmittance can be increased while improving the reflection tint, the maximum value of the natural light reflectivity in a range of 500 nm or more and less than 600 nm is preferably 11% to 20%, and more preferably 12% to 20%.

From the viewpoint that the brightness of the display image can be increased while improving the reflection tint, the maximum value of the natural light reflectivity in a range of 600 nm or more and 800 nm of less is preferably 15% to 23%, and more preferably 16% to 23%.

From the viewpoint that the transmittance can be increased while improving the reflection tint, the difference between the greatest maximum value and the smallest minimum value of the natural light reflectivity in a range of 400 nm or more and less than 500 nm is preferably 4% to 20%, and more preferably 4% to 12%.

Similarly, from the viewpoint that the transmittance can be increased while improving the reflection tint, the difference between the greatest maximum value and the smallest minimum value of the natural light reflectivity in a range of 500 nm or more and less than 600 nm is preferably 4% to 20%, and more preferably 4% to 12%.

From the viewpoint that the transmittance can be increased while improving the reflection tint, a wavelength bandwidth in a region where a reflectivity is higher than the average value of the maximum value and the minimum value of the reflectivity in a range of 400 nm or more and less than 500 nm is preferably 30 nm or more and 78 nm or less, and more preferably 35 nm or more and 75 nm or less.

Similarly, from the viewpoint that the transmittance can be increased while improving the reflection tint, a wavelength bandwidth in a region where a reflectivity is higher than the average value of the maximum value and the minimum value of the reflectivity in a range of 500 nm or more and less than 600 nm is preferably 30 nm or more and 78 nm or less, and more preferably 35 nm or more and 75 nm or less.

In the wavelength bandwidths in a range of 400 nm or more and less than 500 nm, and the wavelength bandwidth in a range of 500 nm or more and less than 600 nm, it is advantageous for the transmittance as the width is narrower. However, the reflection tint may be deteriorated in a case where the wavelength bandwidth in a range of 400 nm or more and less than 500 nm and/or the wavelength bandwidth in a range of 500 nm or more and less than 600 nm is too narrow because the wavelength bandwidth in a range of 600 nm or more and 800 nm or less is wide. For this reason, the wavelength bandwidth in a range of 400 nm or more and less than 500 nm and the wavelength bandwidth in a range of 500 nm or more and less than 600 nm are preferably within the above ranges.

In addition, the wavelength bandwidth in a range of 500 nm or more and less than 600 nm has a large influence on the transmittance.

From the viewpoint of improving the front brightness of the display image while improving the reflection tint, the wavelength bandwidth in the region where a reflectivity is higher than the average value of the maximum value and the minimum value of the reflectivity in a range of 600 nm or more and 800 nm or less is preferably 120 nm or more and 200 nm or less.

Here, as illustrated in FIG. 1, it is preferable that the selective reflection layer has two or more cholesteric liquid crystal layers having different selective reflection center wavelengths. In addition, individual cholesteric liquid crystal layers are in direct contact with any other cholesteric liquid crystal layers. For example, in the example illustrated in FIG. 1, the cholesteric liquid crystal layer 12R having a selective reflection center wavelength in the red wavelength range, the cholesteric liquid crystal layer 12G having a selective reflection center wavelength in the green wavelength range are arranged in contact with each other, and the cholesteric liquid crystal layer 12G having a selective reflection center wavelength in the green wavelength range, the cholesteric liquid crystal layer 12B having a selective reflection center wavelength in the blue wavelength range are arranged in contact with each other.

In a case where the cholesteric liquid crystal layers are spaced from each other, a film thickness between the layers is thick, and it is difficult to obtain the effect of interference of light reflected by each of the cholesteric liquid crystal layers. On the other hand, by adopting a configuration in which the cholesteric liquid crystal layers are in contact with each other, the wavelength bandwidth can be narrowed because of the effect of interference of light reflected by each of the cholesteric liquid crystal layers. In particular, in a case where a film thickness of each of the cholesteric liquid crystal layers is thinner than a wavelength of light (visible light of 380 nm to 780 nm), the effect of interference is more remarkable.

In the present invention, in a case where the selective reflection layer 11 includes two or more cholesteric liquid crystal layers, the cholesteric liquid crystal layers are not limited to a configuration in which the individual cholesteric liquid crystal layers are in direct contact with each other, and the cholesteric liquid crystal layers may be configured to be laminated via an adhesive layer or the like.

Here, each of the cholesteric liquid crystal layers may have at least one selective reflection center wavelength, but at least one cholesteric liquid crystal layer may have two or more selective reflection center wavelengths. A cholesteric liquid crystal layer having two or more selective reflection center wavelengths is achieved by adopting a helical structure in which a helical pitch changes in a thickness direction.

In the example illustrated in the figure, the selective reflection layer 11 has a configuration in which three cholesteric liquid crystal layers having different selective reflection center wavelengths are provided. However, the present invention is not limited thereto, and the selective reflection layer 11 may be a cholesteric liquid crystal layer having a single layer, and may be a cholesteric liquid crystal layer having two or four or more cholesteric liquid crystal layers.

The total thickness of the selective reflection layer 11 is preferably 0.4 μm to 2.0 μm, more preferably 0.6 μm to 1.8 μm, and still more preferably 0.8 μm to 1.4 μm.

In a case where the total thickness of the selective reflection layer 11 is too thin, the natural light reflectivity of the selective reflection layer 11 is too low, and there is a possibility that the brightness of the display image cannot be increased. By contrast, in a case where the total thickness of the selective reflection layer 11 is too thick, the transmittance may decrease.

Here, the reflection film according to the embodiment of the present invention preferably reflects linearly polarized light. In a case where the reflection film is incorporated in the windshield glass and used as a combiner for a head-up display, the projected image light is preferably p-polarized light, that is, linearly polarized light in order to prevent reflection on the surface of the windshield glass.

On the other hand, in the present invention, the selective reflection layer has a cholesteric liquid crystal layer and reflects circularly polarized light.

Therefore, the reflection film according to the embodiment of the present invention preferably has a layer that converts linearly polarized light incident on the reflection film into circularly polarized light. Examples of the layer that converts a polarization state of light include a polarization conversion layer and a retardation layer.

The polarization conversion layer exhibits optical rotation properties and birefringence with respect to visible light, and converts a polarization state of incident light. In the present invention, the polarization conversion layer formed of a layer in which a material having birefringence, such as a liquid crystal compound, is aligned with the amount of twist at 360° or less.

In the retardation layer, a phase difference (optical path difference) is added to two orthogonal polarized light components to change the state of the incident polarized light. In the present invention, the retardation layer is a layer formed by a material having birefringence, such as a liquid crystal compound, which is aligned in the same direction, and does not have optical rotation properties.

By adopting a configuration in which the reflection film has a polarization conversion layer or a retardation layer on the selective reflection layer side onto which light is incident, linearly polarized light incident on the reflection film is converted into circularly polarized light, the selective reflection layer reflects circularly polarized light, and the reflected circularly polarized light is converted into linearly polarized light by the polarization conversion layer or the retardation layer and emitted.

Here, in the example illustrated in FIG. 1, the reflection film 10 includes the polarization conversion layer 14 on one side of the selective reflection layer 11 and the retardation layer 16 on the other side thereof. In a case where such a reflection film 10 is incorporated into the windshield glass, as an example illustrated in FIG. 3 described later, the polarization conversion layer 14 is arranged on the first glass plate 28 side, which is the inside of the vehicle, and the retardation layer 16 is arranged on the second glass plate 30 side, which is the outside of the vehicle.

In this case, the polarization conversion layer 14 has a function of converting the projected p-polarized light (linearly polarized light) into circularly polarized light reflected by the cholesteric liquid crystal layer of the selective reflection layer 11.

On the other hand, the retardation layer 16 has a function of optically compensating for light incident from the outside of the windshield glass. For example, in a case of s-polarized light incident from the outside of the windshield glass, a polarization state changes when the s-polarized light passes through the polarization conversion layer 14, and a component of p-polarized light is mixed. Since a polarized sunglass shields the s-polarized light, this component of the p-polarized light transmits the polarized sunglass. Therefore, there is a problem that the function of the polarized sunglass to cut the glare of the reflected light that is mainly composed of s-polarized light is impaired, which hinders driving. By contrast, a configuration in which the retardation layer 16 is provided, and the retardation layer 16 is used for optical compensation enables an improvement of the suitability for polarized sunglass.

Figure 3:
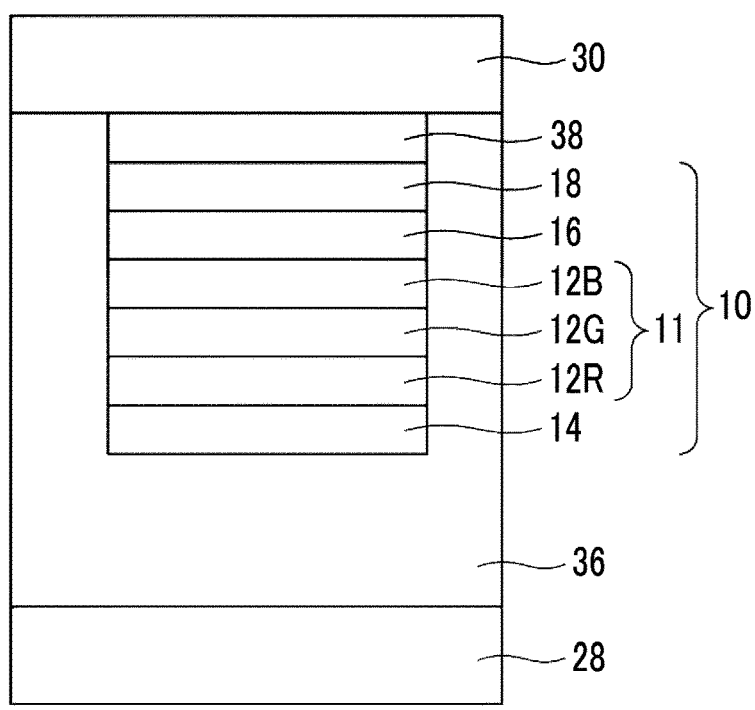
FIG. 3 is a schematic diagram illustrating an example of a windshield glass including the reflection film of the present invention.

In the example illustrated in FIG. 3, the reflection film 10 has a configuration in which the polarization conversion layer 14 is arranged on the first glass plate 28 side, which is the inside of the vehicle, and the retardation layer 16 is arranged on the second glass plate 30 side, which is on the outside of the vehicle, but the present invention is not limited thereto. The reflection film 10 may have a configuration in which the polarization conversion layer 14 is arranged on the second glass plate 30 side, which is the outside of the vehicle, and the retardation layer 16 is arranged on the first glass plate 28 side, which is the inside of the vehicle.

In this case, the retardation layer 16 has a function of converting the projected p-polarized light (linearly polarized light) into circularly polarized light reflected by the cholesteric liquid crystal layer of the selective reflection layer 11.

On the other hand, the polarization conversion layer 14 has a function of optically compensating for light incident from the outside of the windshield glass, and optical compensation by the polarization conversion layer 14 enables an improvement of the suitability for the polarized sunglass.

In addition, the reflection film of the present invention may have a configuration in which polarization conversion layers are provided on both sides of the selective reflection layer 11 or a configuration in which retardation layers are provided on both sides.

In this case, a polarization conversion layer or a retardation layer arranged inside the vehicle may be configured to have a function of converting the projected p-polarized light (linearly polarized light) into circularly polarized light reflected by the cholesteric liquid crystal layer of the selective reflection layer 11.

By contrast, a polarization conversion layer or a retardation layer arranged on the outside of the vehicle may be configured to have a function of optically compensating for light incident from the outside of the windshield glass.

The polarization conversion layer and the retardation layer will be described in detail later.

[Windshield Glass]

The windshield glass according to the embodiment of the present invention is a windshield glass including a first glass plate, the reflection film described above, and a second glass plate, in this order.

The term "windshield glass" means common windows and windshields for vehicles such as cars and trains, airplanes, ships, motorcycles, and vehicles such as playground equipment. The windshield glass is preferably used as a front glass, a windshield glass, or the like in a forward vehicle in a traveling direction.

FIG. 3 illustrates an example of the windshield glass.

A windshield glass 24 illustrated in FIG. 3 includes a first glass plate 28, an interlayer film 36, the reflection film 10, a heat seal layer 38, and a second glass plate 30, in this order.

In FIG. 3, the reflection film 10 has the same configuration as the reflection film 10 illustrated in FIG. 1, and the polarization conversion layer 14 is arranged on the first glass plate 28 side, and the retardation layer 16 (transparent substrate 18) is arranged on the second glass plate 30 side.

In a case where the windshield glass according to the embodiment of the present invention is used in a vehicle, curved glass is often used as the first glass plate 28 and the second glass plate 30. In a case where the first glass plate 28 is positioned inside the vehicle and the second glass plate 30 is positioned outside the vehicle, a convex side of the first glass plate 28 is arranged to face the second glass plate 30, and a concave side of the second glass plate 30 is arranged to face the first glass plate 28.

In a case where each of the first glass plate 28 and the second glass plate 30 is curved glass, in the example illustrated in FIG. 3, the polarization conversion layer 14 and the selective reflection layer 11 are arranged on the convex side of the first glass plate 28, in this order. The retardation layer 16 is arranged between the selective reflection layer 11 and the second glass plate 30.

There is no limit to the visible light transmittance of the windshield glass, but a higher value is preferable. A visible light transmittance of the windshield glass is preferably 70% or more, more preferably more than 70%, even more preferably 75% or more, and particularly preferably 80% or more.

The above described visible light transmittance is preferably satisfied at any position of the windshield glass, and particularly, the above described visible light transmittance is preferably satisfied at a position where the reflection film is present. As described above, a configuration in which the above described visible light transmittance is satisfied can be achieved even in a case where any glass widely used for the windshield glass is used because the reflection film according to the embodiment of the present invention has high visible light transmittance.

Figure 4:
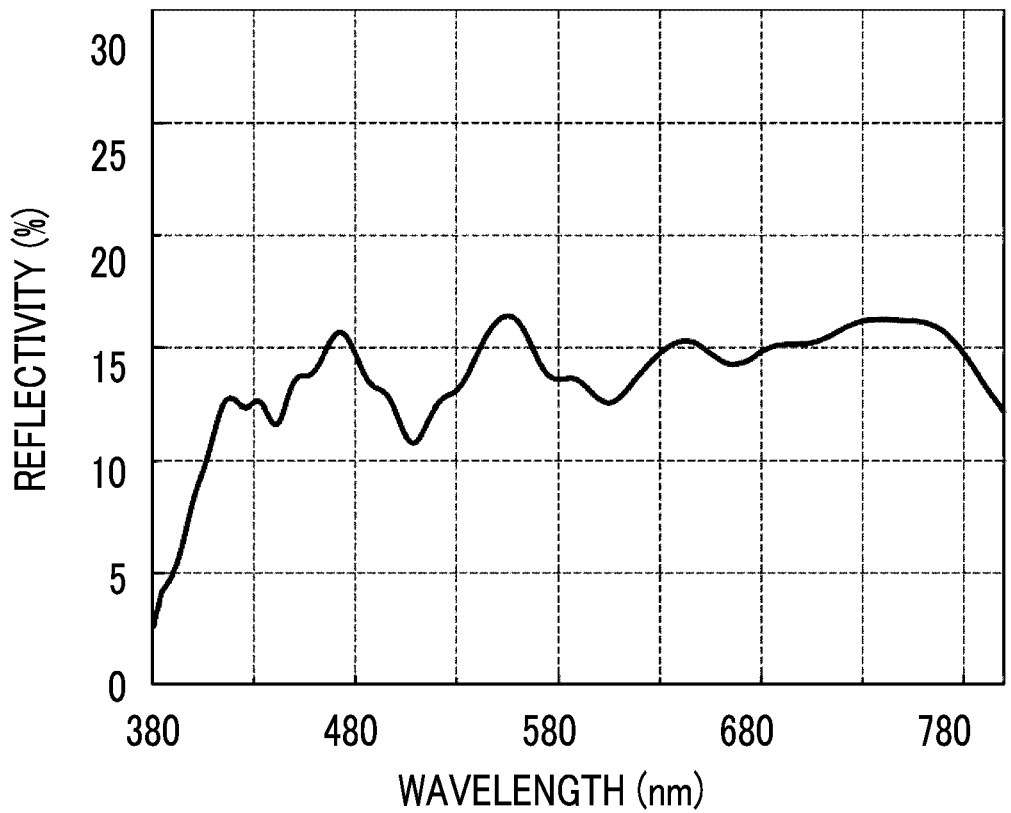
FIG. 4 is a graph illustrating a relationship between a wavelength and a transmittance.

As an example, FIG. 4 illustrates an example of the natural light reflection spectrum in the windshield glass provided with a reflection film having a natural light reflection spectrum illustrated in the graph of FIG. 2 with being sandwiched between two glass plates. This example is the windshield glass of Example 1.

As illustrated in FIG. 4, it can be seen that even though the reflection film according to the embodiment of the present invention is sandwiched between thick glasses, the unevenness of the natural light reflection spectrum caused by the reflection film remains.

The shape of the windshield glass is not limited, and is appropriately determined according to a target on which the windshield glass is arranged. The windshield glass may be, for example, a flat surface or a three-dimensional shape having a curved surface such as a concave or a convex. In the windshield glass molded for an applicable vehicle, the upward direction during normal use, and surfaces becoming the observer side, the driver side, and the visible side such as the inside of the vehicle can be specified.

In the windshield glass, the reflection film may be provided at a projection image display portion (projection image reflection portion) of the windshield glass.

Furthermore, in the windshield glass, the reflection film may be provided between glasses of the windshield glass having a structure of laminated glass, or may be provided on an outer surface of a glass plate of the windshield glass.

In a case where the reflection film according to the embodiment of the present invention is provided on the outer surface of the glass plate of the windshield glass, the reflection film may be provided on the inside (a side into which the projection image is incident) of a vehicle or the like or may be provided on the outside, but is preferably provided on the inside.

The reflection film according to the embodiment of the present invention has lower scratch resistance than the glass plate. Therefore, in a case where the windshield glass has a laminated glass structure, the reflection film is more preferably provided, for the purpose of protection, between two sheets of glass constituting the laminated glass.

As described above, the reflection film is a member for displaying a projection image by reflecting the projection image. Therefore, the reflection film may be provided at a position where the projection image projected from the projector or the like can be visually displayed.

That is, the reflection film according to the embodiment of the present invention functions as a combiner of a head-up display (hereinafter, also referred to as a HUD). In the HUD, the combiner means an optical member that can display a screen image projected from a projector in a visible manner, and in a case where the combiner is observed from a surface side into which the projection image is incident, information on a surface side opposite to the surface side into which the projection light is incident can be observed at the same time. That is, the combiner functions as an optical path combiner for superimposing and displaying external light and light of a projection image.

The reflection film may be provided on the entire surface of the windshield glass, or may be provided on a part of the windshield glass in a plane direction, but is preferably provided on a part of the windshield glass.

In a case where the reflection film is provided on a part of the windshield glass, the reflection film may be provided at any position on the windshield glass, but the reflection film is preferably provided so that a virtual image is displayed at a position where the image can be easily visible from an observer such as a driver during the use of the HUD. For example, a position where the reflection film is provided on the windshield glass may be determined based on the relationship between a position of the driver's seat in the vehicle in which the HUD is mounted and a position where the projector is installed.

The reflection film may have a flat surface shape having no curved surface, but may have a curved surface. In addition, the reflection film may have a concave or convex shape as an entirety, and the projection image may be displayed to be enlarged or reduced.

Hereinafter, components included in the reflection film and the windshield glass according to the embodiment of the present invention will be described.

<Selective Reflection Layer>

The selective reflection layer has a cholesteric liquid crystal layer and performs reflection that satisfies the above-described requirements (i) to (iii).

[Cholesteric Liquid Crystal Layer]

The cholesteric liquid crystal layer means a layer with a cholesteric liquid crystalline phase immobilized.

The cholesteric liquid crystal layer may be any layer as long as the alignment of a liquid crystal compound serving as the cholesteric liquid crystalline phase is maintained. The cholesteric liquid crystal layer may be typically a layer in which the polymerizable liquid crystal compound may be brought into the alignment state of a cholesteric liquid crystalline phase and polymerized and cured by ultraviolet light irradiation, heating, and the like to form a layer that has no fluidity and also whose alignment is not changed by an external field or an external force. In the cholesteric liquid crystal layer, it is sufficient that optical properties of the cholesteric liquid crystalline phase are maintained in the layer, and the liquid crystal compound in the layer may not exhibit liquid crystal properties anymore. For example, the polymerizable liquid crystal compound may have high molecular weight due to a curing reaction and may already lose liquid crystal properties.

It is known that the cholesteric liquid crystalline phase exhibits properties of selectively reflecting circularly polarized light, that is, the cholesteric liquid crystalline phase selectively reflects circularly polarized light with any one sense of levorotatory circularly polarized light or dextrorotatory circularly polarized light, and transmits circularly polarized light with the other sense.

A large number of films formed of a composition including a polymerizable liquid crystal compound have been known in the related art, as a film including a layer with a cholesteric liquid crystalline, which exhibits properties of selectively reflecting circularly polarized light phase and is immobilized. Thus, regarding the cholesteric liquid crystal layer, the technologies of the related art can be referred to.

A center wavelength λ of selective reflection (selective reflection center wavelength) by the cholesteric liquid crystal layer depends on a pitch P (=a period of a helix) of a helical structure (helical alignment structure) in the cholesteric liquid crystalline phase, and is based on a relationship between an average refractive index n of the cholesteric liquid crystal layer and λ=n×P. As is clear from the above Expression, the selective reflection center wavelength can be controlled by adjusting the n value and/or the P value.

In other words, the pitch P (one pitch of a helix) of the helical structure is the length in the helical axial direction for one turn of a helix, that is the length in the helical axial direction in which a director (the long axis direction in a rod-like liquid crystal) of the liquid crystal compound for forming the cholesteric liquid crystalline phase is rotated by 360°. The helical axial direction of the normal cholesteric liquid crystal layer coincides with a thickness direction of the cholesteric liquid crystal layer.

As an example, the selective reflection center wavelength and a half-width of the cholesteric liquid crystal layer can be obtained as follows.

In a case where the reflection spectrum of the cholesteric liquid crystal layer is measured from a normal direction using a spectrophotometer (manufactured by JASCO Corporation, V-670), a peak having a decreased transmittance is observed in the selective reflection band. Among the two wavelengths that are intermediate (average) transmittance between a smallest minimum transmittance of the peak and a transmittance before the peak transmittance is reduced, assuming that a wavelength value of a shorter wavelength side is set (nm) and a wavelength value of a longer wavelength side is set $\lambda_h$ (nm), the selective reflection center wavelength λ and the half-width Δλ can be expressed by the following expression.

$$\lambda=(\lambda_l+\lambda_h)/2, \Delta\lambda=(\lambda_h-\lambda_l)$$

The selective reflection center wavelength which is obtained as described above substantially coincides with a wavelength at the center of gravity of reflection peak of circular polarization reflection spectra measured in the normal direction of the cholesteric liquid crystal layer.

In the head-up display system described later, the reflectivity at the surface of a glass plate on the projection light incidence side can be decreased by using the head-up display system so that light is obliquely incident on the windshield glass.

At this time, light is also obliquely incident on the cholesteric liquid crystal layer constituting the selective reflection layer 11 of the reflection film 10. For example, light that is incident at an angle of 45° to 70° relative to the normal line of the reflection film 10 in the air having a refractive index of 1 is transmitted through a cholesteric liquid crystal layer having a refractive index of about 1.61 at an angle of about 26° to 36°. In this case, the reflection wavelength shifts to the shorter wavelength side.

In a case where the selective reflection center wavelength is a wavelength $\lambda_d$ when a ray passes through a cholesteric liquid crystal layer having the selective reflection center wavelength as a wavelength λ at an angle $\theta_2$ with respect to the normal direction of the cholesteric liquid crystal layer (helical axial direction of cholesteric liquid crystal layer), the wavelength $\lambda_d$ is represented by the following Expression.

$$\lambda_d=\lambda\times\cos\theta_2$$

Therefore, the cholesteric liquid crystal layer having a selective reflection center wavelength in a range of 650 to 780 nm at an angle $\theta_2$ of 26° to 36° can reflect projection light in a range of 520 to 695 nm, for example.

Such a wavelength range is a wavelength range with high luminosity factor and thus highly contributes to the brightness of the projection image, and as a result, a projection image with high brightness can be realized.

The helical pitch of the cholesteric liquid crystalline phase depends on the type of chiral agents used together with the polymerizable liquid crystal compound and the addition concentration thereof. Thus, a desired pitch can be obtained by adjusting the type and the addition concentration. As a method of measuring helical sense and pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

As each cholesteric liquid crystal layer, a cholesteric liquid crystal layer in which the helical sense is right or left is used. The sense of circular polarization reflected by the cholesteric liquid crystal layer (turning direction of circular polarization) coincides with a helical sense.

In a case where the plurality of cholesteric liquid crystal layers having selective reflection center wavelengths different from each other are provided, a helical sense of each cholesteric liquid crystal layer may be the same as each other or different from each other. However, it is preferable that all of helical senses of the plurality of cholesteric liquid crystal layers are the same as each other.

In a case where the reflection film 10 includes a plurality of the cholesteric liquid crystal layers as the selective reflection layer 11, the reflection film 10 preferably does not include cholesteric liquid crystal layers having different helical senses as cholesteric liquid crystal layers that exhibit selective reflection in the same or overlapping wavelength range. The reason for this is to avoid a decrease in the transmittance to, for example, less than 50% in a specific wavelength range.

A half-width Δλ (nm) of a selective reflection band exhibiting selective reflection depends on the birefringence Δn of the liquid crystal compound and the pitch P and satisfies a relationship of Δλ=Δn×P. Accordingly, a width of the selective reflection band can be controlled by adjustment of the Δn. The value of Δn can be adjusted by adjusting the type of the polymerizable liquid crystal compound or a mixing ratio thereof or controlling a temperature at the time of fixing the alignment.

In order to form one type of cholesteric liquid crystal layer having the same selective reflection center wavelength, a plurality of cholesteric liquid crystal layers having the same pitch P and the same helical sense may be laminated. By lamination of the cholesteric liquid crystal layers having the same pitch P and the same helical sense, the circular polarization selectivity at a specific wavelength can be increased.

In the selective reflection layer 11, in a case where the plurality of cholesteric liquid crystal layers are laminated, a separately prepared cholesteric liquid crystal layer may be laminated using an adhesive or the like, or a step of directly applying a liquid crystal composition containing a polymerizable liquid crystal compound and the like to the surface of the cholesteric liquid crystal layer formed by a method which will be described later, and carrying out alignment and immobilization may be repeatedly performed, and the latter is preferable.

This is because, by directly forming a subsequent cholesteric liquid crystal layer to the surface of a cholesteric liquid crystal layer formed in advance, an alignment direction of liquid crystal molecules on an air interface side of the cholesteric liquid crystal layer formed in advance and an alignment direction of liquid crystal molecules on a lower side of the cholesteric liquid crystal layer formed thereon coincide with each other, and excellent polarization characteristics of the laminate of the cholesteric liquid crystal layers are obtained. Furthermore, this is because, interference unevenness which may occur due to uneven thickness of the adhesive layer is not observed.

The thickness of the cholesteric liquid crystal layer is preferably 0.5 to 10 µm, more preferably 1.0 to 8.0 µm, and even more preferably 1.5 to 6.0 µm.

(Production Method of Cholesteric Liquid Crystal Layer)

Hereinafter, production materials and a producing method of the cholesteric liquid crystal layer will be described.

As a material used for formation of the cholesteric liquid crystal layer, a liquid crystal composition including a polymerizable liquid crystal compound and a chiral agent (optically active compound) is used. The liquid crystal composition with a surfactant, a polymerization initiator, or the like being further mixed and dissolved in a solvent or the like, as necessary, is applied to a support, an alignment layer, and a cholesteric liquid crystal layer to serve as an underlayer. After cholesteric alignment is matured, the alignment can be immobilized by curing of the liquid crystal composition to form a cholesteric liquid crystal layer.

(Polymerizable Liquid Crystal Compound)

The polymerizable liquid crystal compound may be a rod-like liquid crystal compound or a disk-like liquid crystal compound, and a rod-like liquid crystal compound is preferable.

As an example of the rod-like polymerizable liquid crystal compound for forming the cholesteric liquid crystal layer, a rod-like nematic liquid crystal compound is used. As the rod-like nematic liquid crystal compound, an azomethine compound, an azoxy compound, a cyanobiphenyl compound, a cyanophenyl ester compound, a benzoate ester compound, a phenylester cyclohexanecarboxylate compound, a cyanophenylcyclohexane compound, a cyano-substituted phenylpyrimidine compound, an alkoxy-substituted phenylpyrimidine compound, a phenyldioxane compound, a tolane compound, or an alkenylcyclohexylbenzonitrile compound is preferably used. Not only a low-molecular liquid crystal compound, but also a high-molecular liquid crystal compound can be used.

The polymerizable liquid crystal compound can be obtained by introducing a polymerizable group into the liquid crystal compound. The examples of a polymerizable group include an unsaturated polymerizable group, an epoxy group, an aziridinyl group, and an unsaturated polymerizable group is preferable, and an ethylenically unsaturated polymerizable group is particularly preferable. The polymerizable group can be introduced into the molecules of the liquid crystal compound using various methods. The number of polymerizable groups having the polymerizable liquid crystal compound is preferably 1 to 6 and more preferably 1 to 3 per molecule.

Examples of the polymerizable liquid crystal compound include compounds disclosed in Makromol. Chem., vol. 190, pp. 2255 (1989), Advanced Material, vol. 5, pp. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-016616A (JP-H06-016616A), JP1995-110469A (JP-H07-110469A), JP1999-080081A (JP-H11-080081A), JP2001-328973A, and the like. Two or more polymerizable liquid crystal compounds may be used in combination. In a case where the two or more polymerizable liquid crystal compounds are used in combination, the alignment temperature can be decreased.

The addition amount of the polymerizable liquid crystal compound contained in the liquid crystal composition is preferably 80% to 99.9% by mass, more preferably 85% to 99.5% by mass, and particularly preferably 90% to 99% by mass with respect to the mass of solid content (the mass excluding a solvent) in the liquid crystal composition.

In order to improve the visible light transmittance, the cholesteric liquid crystal layer may have a low Δn. The cholesteric liquid crystal layer having a low Δn can be formed by using a low Δn polymerizable liquid crystal compound. Hereafter, the low-Δn polymerizable liquid crystal compound will be specifically described.

(Polymerizable Liquid Crystal Compound Having Low Δn)

A cholesteric liquid crystalline phase is formed by using the low-Δn polymerizable liquid crystal compound, and the cholesteric liquid crystalline phase is immobilized to form a film, thereby obtaining a narrow-band selective reflection layer. Examples of the polymerizable liquid crystal compounds having a low Δn include compounds described in WO2015/115390A, WO2015/147243A, WO2016/035873A, JP2015-163596A, and JP2016-053149A. Regarding the liquid crystal composition to provide a selective reflection layer having a small half-width, WO2016/047648A can be referred to.

It is also preferable that the liquid crystal compound is a polymerizable compound represented by Formula (I) described in WO2016/047648A.

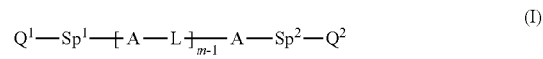
(I)

In Formula (I), A represents a phenylene group which may have a substituent or a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms, and a group in which one or two or more —CH$_2$— is substituted with —O—, —S—, —NH—, —N(CH$_3$)—, —C(=O)—, —OC(=O)—, or —C(=O)O— in a linear or branched alkylene group having 1 to 20 carbon atoms, and Q$^1$ and Q$^2$ each independently represent a polymerizable group selected from the group consisting of a hydrogen atom or a group represented by Formulae Q-1 to Q-5, where, any one of Q$^1$ or Q$^2$ represents a polymerizable group.

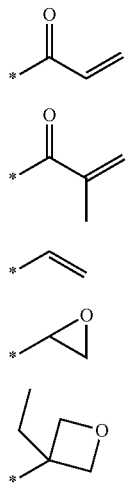

Q-1

Q-2

Q-3

Q-4

Q-5

In Formula (I), the phenylene group is preferably a 1,4-phenylene group.

Regarding the phenylene group and the trans-1,4-cyclohexylene group, the substituent in a case of "may have a substituent" is not particularly limited, and examples thereof include an alkyl group, a cycloalkyl group, an alkoxy group, an alkyl ether group, an amide group, an amino group, a halogen atom, and a substituent selected from the group consisting of a group formed by combining two or more of the above substituents. In addition, examples of the substituent include a substituent represented by —C(=O)—X$^3$-Sp$^3$-Q$^3$ described later. The phenylene group and the trans-1,4-cyclohexylene group may have 1 to 4 substituents. In a case where the phenylene group and the trans-1,4-cyclohexylene group have two or more substituents, two or more substituents may be the same as or different from each other.

The alkyl group may be linear or branched. The number of carbon atoms of the alkyl group is preferably 1 to 30, more preferably 1 to 10, and even more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a linear or branched heptyl group, an octyl group, a nonyl group, a decyl group, an undecyl group, or a dodecyl group. The above description regarding the alkyl group is also applied to an alkoxy group including an alkyl group. Specific examples of the alkylene group which is referred to as an alkylene group include a divalent group obtained by removing any one hydrogen atom from each of the above examples of the alkyl group. Examples of the halogen atom include a fluorine atom, a chlorine atom, a bromine atom, and an iodine atom.

The number of carbon atoms of the cycloalkyl group is preferably 3 to 20, more preferably 5 or more, and is preferably 10 or less, more preferably 8 or less, still more preferably 6 or less. Examples of the cycloalkyl group include a cyclopropyl group, a cyclobutyl group, a cyclopentyl group, a cyclohexyl group, a cycloheptyl group, and a cyclooctyl group.

As the substituents that the phenylene group and the trans-1,4-cyclohexylene group may have, substituents selected from the group consisting of an alkyl group and an alkoxy group, —C(=O)—X$^3$-Sp$^3$-Q$^3$ are particularly preferable. Here, X$^3$ represents a single bond, —O—, —S—, or —N(Sp$^4$-Q$^4$)-, or represents a nitrogen atom forming a ring structure together with Q$^3$ and Sp$^3$. Sp$^3$ and Sp$^4$ each independently represent a single bond or a linking group selected from the group consisting of a linear or branched alkylene group having 1 to 20 carbon atoms, and a group in which one or two or more —CH$_2$— is substituted with —O—, —S—, —NH—, —N(CH$_3$)—, —C(=O)—, —OC(=O)—, or —C(=O)O— in a linear or branched alkylene group having 1 to 20 carbon atoms.

Q$^3$ and Q$^4$ each independently represent a hydrogen atom, a cycloalkyl group, a group in which one or two or more —CH$_2$— is substituted with —O—, —S—, —NH—, —N(CH$_3$)—, —C(=O)—, —OC(=O)—, —C(=O)O— in a cycloalkyl group, or any other polymerizable group selected from the group consisting of a group represented by formulae Q-1 to Q-5.

In the cycloalkyl group, a group in which one or two or more —CH$_2$— is substituted with —O—, —S—, —NH—, —N(CH$_3$)—, —C(=O)—, —OC(=O)—, or —C(=O)O— specifically includes a tetrahydrofuranyl group, a pyrrolidinyl group, an imidazolidinyl group, a pyrazolidinyl group, a piperidyl group, a piperazinyl group, a morpholinyl group, and the like. The substitution position is not particularly limited. Among these, a tetrahydrofuranyl group is preferable, and a 2-tetrahydrofuranyl group is particularly preferable.

In Formula (I), L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m-1 L's may be the same as or different from each other.

Sp$^1$ and Sp$^2$ each independently represent a single bond or a linking group selected from the group consisting of a linear or branched alkylene group having 1 to 20 carbon atoms, and a group in which one or two or more —CH$_2$— is substituted with —O—, —S—, —NH—, —N(CH$_3$)—, —C(=O)—, —OC(=O)—, or —C(=O)O— in a linear or branched alkylene group having 1 to 20 carbon atoms. Sp$^1$ and Sp$^2$ each preferably independently represent a linking group formed by combining one or two or more groups selected from the group consisting of a linear alkylene group having 1 to 10 carbon atoms to which a linking group selected from the group consisting of —O—, —OC(=O)—, and —C(=O)O— is bonded, —OC(=O)—, —C(=O)O—, —O—, and a linear alkylene group having 1 to 10 carbon atoms at both terminals respectively, and more preferably represent a linear alkylene group having 1 to 10 carbon atoms to which —O— is bonded at both terminals, respectively.

$Q^1$ and $Q^2$ each independently represent a hydrogen atom or a polymerizable group selected from the group consisting of the groups represented by the formulae Q-1 to Q-5, where, either one of $Q^1$ or $Q^2$ represents a polymerizable group.

The polymerizable group is preferably an acryloyl group (Formula Q-1) or a methacryloyl group (Formula Q-2).

In Formula (I), m represents an integer of 3 to 12. m preferably represents an integer of 3 to 9, more preferably represents an integer of 3 to 7, and even more preferably represents an integer of 3 to 5.

The polymerizable compound represented by Formula (I) preferably includes at least one phenylene group which may have a substituent as A and at least one trans-1,4-cyclohexylene group which may have a substituent. The polymerizable compound represented by Formula (I) preferably includes 1 to 4 trans-1,4-cyclohexylene groups which may have a substituent as A, more preferably 1 to 3 trans-1,4-cyclohexylene groups, and still more preferably 2 or 3 trans-1,4-cyclohexylene groups. In addition, the polymerizable compound represented by Formula (I) preferably includes one or more phenylene groups which may have a substituent as A, more preferably 1 to 4 phenylene groups, still more preferably 1 to 3 phenylene groups, and particularly preferably 2 or 3 phenylene groups.

In Formula (I), in a case where a number obtained by dividing the number of trans-1,4-cyclohexylene groups represented by A by m is determined as mc, mc preferably satisfies $0.1<mc<0.9$, more preferably satisfies $0.3<mc<0.8$, and even more preferably satisfies $0.5<mc<0.7$. The liquid crystal composition preferably includes a polymerizable compound represented by Formula (I) in a range of $0.5<mc<0.7$, and a polymerizable compound represented by Formula (I) in a range of $0.1<mc<0.3$.

Specific examples of the polymerizable compound represented by Formula (I) include compounds described in paragraphs 0051 to 0058 of WO2016/047648A, compounds described in JP2013-112631A, JP2010-070543A, JP4725516B, WO2015/115390A, WO2015/147243A, WO2016/035873A, JP2015-163596A, and JP2016-053149A, or the like.

(Chiral Agent: Optically Active Compound)

The chiral agent has a function of inducing a helical structure of the cholesteric liquid crystalline phase. Chiral agents may be selected according to the purpose because induced helical senses or pitches are different depending on compounds.

The chiral agent is not particularly limited and known compounds can be used. Examples of chiral agents include compounds described in Liquid Crystal Device Handbooks (Chapter 3, 4-3, Chiral Agents for TN and STN, p. 199, edited by Japan Society for the Promotion of Science, 142 Committee, 1989), JP2003-287623A, JP2002-302487A, JP2002-080478A, JP2002-080851A, JP2010-181852, or JP2014-034581A.

The chiral agent generally includes asymmetric carbon atoms. However, an axially asymmetric compound or a planar asymmetric compound, which does not have asymmetric carbon atoms, can also be used as a chiral agent. Examples of the axially asymmetric compound or the planar asymmetric compound include binaphthyl, helicene, paracyclophane, and derivatives thereof.

The chiral agent may include a polymerizable group. In a case where both the chiral agent and the liquid crystal compound contain polymerizable groups, a polymer that includes a repeating unit derived from a polymerizable liquid crystal compound and a repeating unit derived from the chiral agent can be formed by a polymerization reaction of a polymerizable chiral agent and the polymerizable liquid crystal compound. In this aspect, the polymerizable group contained in the polymerizable chiral agent is preferably the same group as the polymerizable group contained in the polymerizable liquid crystal compound. Accordingly, examples of a polymerizable group of the chiral agent preferably include an unsaturated polymerizable group, an epoxy group, and an aziridinyl group, an unsaturated polymerizable group is more preferable, and an ethylenically unsaturated polymerizable group is particularly preferable.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 manufactured by BASF SE may be used.

A content of the chiral agent in the liquid crystal composition is preferably 0.01% to 200% by mol and more preferably 1% to 30% by mol, with respect to the amount of the polymerizable liquid crystal compound. A content of the chiral agent in the liquid crystal composition is intended to be the concentration (% by mass) of the chiral agent with respect to the total solid content in the liquid crystal composition.

In addition, as described above, the cholesteric liquid crystal layer of the selective reflection layer included in the reflection film according to the embodiment of the present invention may have two or more selective reflection center wavelengths. A cholesteric liquid crystal layer having two or more selective reflection center wavelengths is achieved by causing pitches of the helical structure to be changed in a thickness direction. The irradiation amount of light can be changed in the thickness direction to produce the cholesteric liquid crystal layer in which the pitches of the helical structure change in the thickness direction by using a chiral agent with helical twisting power (HTP) changing upon irradiation with light.

In addition, examples of the chiral agent with the HTP changing upon irradiation with light include a chiral agent that causes return isomerization, dimerization, isomerization and dimerization, and the like upon irradiation with light.

In a case where the chiral agent has a photoisomerization group, the photoisomerization group is preferably an isomerization moiety, an azo group, an azoxy group, or a cinnamoyl group of a compound exhibiting photochromic properties. As specific examples of the compound, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, JP2003-313292A, and the like can be used.

(Polymerization Initiator)

The liquid crystal composition preferably includes a polymerization initiator. In an aspect of carrying out a polymerization reaction with ultraviolet light irradiation, the polymerization initiator used is preferably a photopolymerization initiator capable of starting a polymerization reaction with ultraviolet light irradiation.

Examples of the photopolymerization initiator include α-carbonyl compounds (described in each specification of U.S. Pat. Nos. 2,367,661A and 2,367,670A), acyloin ethers (described in U.S. Pat. No. 2,448,828A), α-hydrocarbonsubstituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and a p-aminophenylketone (described in U.S. Pat. No. 3,549,367A), acridine and phenazine compounds (described in JP1985-105667A (JP-S60-105667A), U.S. Pat. No. 4,239,850A), acylphosphine oxide compounds (described in JP1988-040799B (JP-S63-040799B), JP1993-029234B (JP-H5-029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, JP2014-500852), oxime compounds (described in JP2000-066385A and JP4454067B), and oxadiazole compounds (described in U.S. Pat. No. 4,212,970A), and the like. For example, the description of paragraphs 0500 to 0547 of JP2012-208494A can also be referred to.

As the polymerization initiator, it is also preferable to use the acylphosphine oxide compounds or the oxime compounds.

As the acylphosphine oxide compounds, for example, IRGACURE 810 (compound name: bis(2,4,6-trimethylbenzoyl)-phenylphosphine oxide) which is a commercially available product and manufactured by BASF Japan Ltd. can be used. As examples of the oxime compounds, IRGACURE OXE 01 (manufactured by BASF SE), IRGACURE OXE 02 (manufactured by BASF SE), TR-PBG-304 (manufactured by Changzhou Tronly Advanced Electronic Materials Co., Ltd.), Adeka Arkls NCI-930 (manufactured by ADEKA CORPORATION), Adeka Arkls NCI-831 (manufactured by ADEKA CORPORATION), and the like which are commercially available products can be used.

The polymerization initiator may be used singly or in combination of two or more kinds thereof.

A content of the photopolymerization initiator in the liquid crystal composition is preferably 0.1% to 20% by mass and more preferably 0.5% to 5% by mass, with respect to a content of the polymerizable liquid crystal compound.

(Cross-Linking Agent)

In order to improve a film hardness after curing and to improve durability, the liquid crystal composition may include any cross-linking agent. The cross-linking agent which is cured with ultraviolet light, heat, or moisture can be suitably used.

The cross-linking agent is not particularly limited, and can be appropriately selected according to the purpose. Examples of the cross-linking agent include a polyfunctional acrylate compound such as trimethylolpropane tri(meth)acrylate, or pentaerythritol tri(meth)acrylate; an epoxy compound such as glycidyl (meth)acrylate, or ethylene glycol diglycidyl ether; an aziridine compound such as 2,2-bishydroxymethylbutanol-tris [3-(1-aziridinyl) propionate], or 4,4-bis(ethyleneiminocarbonylamino) diphenylmethane; an isocyanate compound such as hexamethylene diisocyanate or biuret type isocyanate; a polyoxazoline compound including an oxazoline group in a side chain; and an alkoxysilane compound such as vinyltrimethoxysilane or N-(2-aminoethyl) 3-aminopropyltrimethoxysilane. In addition, a well-known catalyst can be used in accordance with reactivity of the cross-linking agent, and it is possible to improve the productivity, in addition to the improvement of the film hardness and durability. These may be used singly or in combination of two or more kinds thereof.

The content of the cross-linking agent is preferably 3% to 20% by mass and more preferably 5% to 15% by mass. By setting the content of the cross-linking agent to 3% by mass or more, the effect of improving a crosslinking density can be obtained, and by setting the content of the cross-linking agent 20% by mass or less, a reduction in the stability of the cholesteric liquid crystal layer can be prevented.

The term "(meth)acrylate" is used in the meanings of "either one of or both of acrylate and methacrylate".

(Alignment Control Agent)

An alignment control agent which contributes to stably or rapidly setting the cholesteric liquid crystal layer as a cholesteric liquid crystal layer having planar alignment, may be added into the liquid crystal composition. Examples of the alignment control agent include a fluorine (meth)acrylate-based polymer disclosed in paragraphs [0018] to [0043] of JP2007-272185A, compounds represented by Formulae (I) to (IV) disclosed in paragraphs [0031] to [0034] of JP2012-203237, and compounds disclosed in JP2013-113913.

The alignment control agent may be used singly or in combination of two or more kinds thereof.

The amount of the alignment control agent added into the liquid crystal composition is preferably 0.01% to 10% by mass, more preferably 0.01% to 5% by mass, and particularly preferably 0.02% to 1% by mass, with respect to the total mass of the polymerizable liquid crystal compound.

(Other Additives)

In addition, the liquid crystal composition may include at least one kind selected from various additives such as a surfactant for adjusting the surface tension of a coating film and setting an even film thickness, a polymerizable monomer, and the like. Further, a polymerization inhibitor, an antioxidant, an ultraviolet absorber, a light stabilizer, a coloring material, and metal oxide fine particles may be further added into the liquid crystal composition, as necessary, in a range not deteriorating the optical performance.

Regarding the cholesteric liquid crystal layer, a cholesteric liquid crystal layer having fixed cholesteric regularity can be formed according to the following procedure of: applying a liquid crystal composition, in which a polymerizable liquid crystal compound, a polymerization initiator, and as necessary, a chiral agent, a surfactant, or other agents are dissolved in a solvent, onto a transparent substrate, a retardation layer, an alignment layer, or a cholesteric liquid crystal layer which is produced in advance; drying the liquid crystal composition to obtain a coating film, and irradiating this coating film with an actinic ray to carry out the polymerization of a cholesteric liquid crystalline composition.

In addition, a laminated film consisting of a plurality of the cholesteric liquid crystal layers can be formed by the above-described steps for manufacturing the cholesteric liquid crystal layer being repeatedly carried out.

(Solvent)

A solvent used for preparing the liquid crystal composition is not particularly limited, and is appropriately selected according to the purpose, and an organic solvent is preferably used.

The organic solvent is not particularly limited, and is appropriately selected according to the purpose, and examples thereof include ketones, alkyl halides, amides, sulfoxides, heterocyclic compounds, hydrocarbons, esters, and ethers. These may be used singly or in combination of two or more kinds thereof. Among these, ketones are particularly preferable, in a case of considering the load on the environment.

(Coating, Alignment, and Polymerization)

A coating method of the transparent substrate, the alignment layer, the cholesteric liquid crystal layer serving as an underlayer, and other layers with the liquid crystal composition is not particularly limited, and can be appropriately selected in accordance with the purpose. Examples of the coating method include wire bar coating, curtain coating, extrusion coating, direct gravure coating, reverse gravure coating, die coating, spin coating, dip coating, spray coating, slide coating, and the like. In addition, a method of transferring the liquid crystal composition which is separately applied onto a support can also be implemented.

Liquid crystal molecules are aligned by heating the coated liquid crystal composition. A heating temperature is preferably 200° C. or lower and more preferably 130° C. or lower. By this alignment treatment, an optical thin film in which the polymerizable liquid crystal compound is twist-aligned so as to have a helical axis in a direction substantially perpendicular to a film surface is obtained.

The aligned liquid crystal compound is further polymerized and thereby the liquid crystal composition can be cured. The polymerization may be any of thermal polymerization or photopolymerization with light irradiation, and photopolymerization is preferable. The light irradiation is preferably performed by using ultraviolet light. The irradiation energy is preferably 20 mJ/cm$^2$ to 50 J/cm$^2$ and more preferably 100 to 1,500 mJ/cm$^2$.

In order to promote a photopolymerization reaction, the light irradiation may be performed under the heating conditions or the nitrogen atmosphere. The wavelength of ultraviolet light-irradiated is preferably 350 to 430 nm. A high polymerization reaction rate is preferable, and a reaction rate is preferably 70% or more and more preferably 80% or more, from a viewpoint of stability. The polymerization reaction rate can be determined by measuring the consumption rate of polymerizable functional groups using an infrared absorption spectrum.

<Polarization Conversion Layer>

The polarization conversion layer 14 is preferably a layer with a helical alignment structure of the liquid crystal compound, which is immobilized, and the number of pitches x of the helical alignment structure and a film thickness y (unit: μm) of the polarization conversion layer satisfy all of Relational Expressions (a) to (c) as follows.

$$0.1 \le x \le 1.0 \quad \text{Expression (a)}$$

$$0.5 \le y \le 3.0 \quad \text{Expression (b)}$$

$$3000 \le (1560 \times y)/x \le 50000 \quad \text{Expression (c)}$$

One pitch of the helical structure of the liquid crystal compound is one turn of a helix of the liquid crystal compound. That is, the number of pitches in a state in which the director (the long axis direction in the case of a rod-like liquid crystal) of the helically aligned liquid crystal compound is rotated by 360° is defined as 1.

In a case where the polarization conversion layer has the helical structure of the liquid crystal compound, the polarization conversion layer exhibits optical rotation properties and birefringence with respect to visible light having a wavelength shorter than a reflection peak wavelength in the infrared region. Therefore, the polarization in the visible range can be controlled. By setting the pitch number x of the helical alignment structure of the polarization conversion layer and the film thickness y of the polarization conversion layer within the above ranges, a function of optically compensating the visible light with the polarization conversion layer or a straight line incident on the reflection film A function of converting linearly polarized light (p-polarized light) into circularly polarized light can be provided.

The polarization conversion layer exhibits optical rotation properties and birefringence with respect to visible light because the liquid crystal compound has the helical structure satisfying Relational Expressions (a) to (c). Particularly, by setting the pitch P of the helical structure of the polarization conversion layer to have a length corresponding to the pitch P of the cholesteric liquid crystal layer in which the selective reflection center wavelength is within the long wavelength infrared region, it is possible to exhibit high optical rotation properties and birefringence with respect to visible light having a short wavelength.

$$\text{is "} 0.1 \le x \le 1.0 \text{".} \quad \text{Relational Expression (a)}$$

In a case where the number of pitches x of the helical structure is less than 0.1, disadvantages, such as insufficient optical rotation properties and birefringence, are caused.

In addition, in a case where the number of pitches x of the helical structure is more than 1.0, disadvantages that optical rotation properties and birefringence are excessive, and desired elliptical polarized light cannot be obtained are caused.

$$\text{is "} 0.5 \le y \le 3.0 \text{".} \quad \text{Relational Expression (b)}$$

In a case where the thickness y of the polarization conversion layer is less than 0.5 μm, the film thickness is too thin, disadvantages, such as insufficient optical rotation properties and birefringence, are caused.

In a case where the thickness y of the polarization conversion layer is more than 3.0 μm, disadvantages that optical rotation properties and birefringence are excessive, desired circularly polarized light cannot be obtained, and poor alignment is likely to occur, which is not preferable for production, are caused.

$$\text{is "} 3000 \le (1560 \times y)/x \le 50000 \text{".} \quad \text{Relational Expression (c)}$$

In a case where "(1560×y)/x" is less than 3000, disadvantages that optical rotation properties are excessive, and desired polarization cannot be obtained are caused.

In a case where "(1560×y)/x" is more than 50000, disadvantages that optical rotation properties are insufficient, and desired polarization cannot be obtained are caused.

In the present invention, the number of pitches x of the helical structure of the polarization conversion layer is more preferably 0.1 to 0.8, and the film thickness y is more preferably 0.6 μm to 2.6 μm. In addition, "(1560×y)/x" is more preferably 5000 to 13000.

That is, it is preferable that the polarization conversion layer has a long pitch P of the helical structure and a small number of pitches x.

Specifically, in the polarization conversion layer, it is preferable that the helical pitch P is equal to a pitch P of the cholesteric liquid crystal layer in which the selective reflection center wavelength is within the long wavelength infrared region, and the number of pitches x is small. More specifically, in the polarization conversion layer, it is preferable that the helical pitch P is equal to a pitch P of the cholesteric liquid crystal layer in which the selective reflection center wavelength is within 3000 to 10000 nm, and the number of pitches x is small.

Since the selective reflection center wavelength corresponding to the pitch P in the polarization conversion layer is much longer than that of visible light, the above described optical rotation properties and birefringence with respect to visible light are more suitably exhibited.

The polarization conversion layer can be basically formed in the same manner as a known cholesteric liquid crystal layer. However, during the formation of the polarization conversion layer, it is necessary to adjust the liquid crystal compound to be used, the chiral agent to be used, the amount of the chiral agent added, the film thickness, and the like so that the number of pitches x and the film thickness y [μm] of the helical structure in the polarization conversion layer satisfy all of Relational Expressions (a) to (c).

<Layer with Helical Alignment Structure (Helical Structure) of Liquid Crystal Compound, which is Immobilized>

The layer with a helical alignment structure (helical structure) of the liquid crystal compound, which is immobilized, is a so-called cholesteric liquid crystal layer, and means a layer in which a cholesteric liquid crystalline phase is immobilized.

The cholesteric liquid crystal layer may be any layer as long as the alignment of a liquid crystal compound serving as the cholesteric liquid crystalline phase is maintained. The cholesteric liquid crystal layer may be typically a layer in which the polymerizable liquid crystal compound may be brought into the alignment state of a cholesteric liquid crystalline phase and polymerized and cured by ultraviolet light irradiation, heating, and the like to form a layer that has no fluidity and also whose alignment is not changed by an external field or an external force. In the cholesteric liquid crystal layer, it is sufficient that optical properties of the cholesteric liquid crystalline phase are maintained in the layer, and the liquid crystal compound in the layer may not exhibit liquid crystal properties anymore. For example, the polymerizable liquid crystal compound may have high molecular weight due to a curing reaction and may already lose liquid crystal properties.

As described above, a center wavelength λ of selective reflection (selective reflection center wavelength) by the cholesteric liquid crystal layer depends on a pitch P (=a period of a helix) of a helical structure (helical alignment structure) in the cholesteric liquid crystalline phase, and is based on a relationship between an average refractive index n of the cholesteric liquid crystal layer and λ=n×P. As is clear from the above Expression, the selective reflection center wavelength can be controlled by adjusting the n value and/or the P value.

The helical pitch of the cholesteric liquid crystalline phase depends on the type of chiral agents used together with the polymerizable liquid crystal compound and the addition concentration thereof. Thus, a desired pitch can be obtained by adjusting the type and the addition concentration.

As described above, in the cholesteric liquid crystal layer used as the polarization conversion layer, the helical pitch is adjusted so that the selective reflection center wavelength is within the infrared range at a long wavelength.

The method for forming the cholesteric liquid crystal layer as the polarization conversion layer is basically the same as the above-described method for forming the cholesteric liquid crystal layer.

<Retardation Layer>

In the retardation layer, a phase difference (optical path difference) is added to two orthogonal polarized light components to change the state of the incident polarized light.

In a case where the retardation layer is arranged on the outside of the vehicle and optically compensates, a front phase difference of the retardation layer may be a phase difference that can optically compensate.

In this case, the retardation layer preferably has a front retardation of 50 nm to 160 nm at a wavelength of 550 nm.

In addition, in a case where the windshield glass having the reflection film is mounted in the vehicle, and a direction corresponding to the upper vertical direction of a surface of the first glass plate is 0°, an angle of the slow axis is preferably 10° to 50° or −50° to −10°.

In addition, in a case where the retardation layer converts linearly polarized light into circularly polarized light, as the front phase difference, the retardation layer is preferably configured to provide λ/4, and may be configured to provide 3λ/4 as the front phase difference. In addition, the angle of the slow axis may be arranged to change the incident linearly polarized light into circularly polarized light.

In this case, for example, the front phase difference of the retardation layer at a wavelength of 550 nm is preferably in a range of 100 to 450 nm, and more preferably in a range of 120 to 200 nm or 300 to 400 nm. In addition, in a case where the reflection film 10 is used in a head-up display system, the direction of the slow axis of the retardation layer is preferably determined in accordance with the incident direction of projection light for displaying projection images and the helical sense of the cholesteric liquid crystal layer constituting the selective reflection layer.

The retardation layer is not particularly limited, and can be appropriately selected according to the purpose. Examples of the retardation layer include a stretched polycarbonate film, a stretched norbornene-based polymer film, a transparent film in which inorganic particles having birefringence such as strontium carbonate are included and aligned, a thin film in which oblique deposition of an inorganic dielectric is performed on a support, a film in which the polymerizable liquid crystal compound is uniaxially aligned and the alignment is fixed, a film in which the liquid crystal compound is uniaxially aligned and the alignment is fixed, and the like.

Among these, the retardation layer is suitably a film obtained by uniaxially aligning and fixing a polymerizable liquid crystal compound.

As an example, the retardation layer can be formed in the following order. A liquid crystal composition including a polymerizable liquid crystal compound is applied on a transparent substrate, a temporary support or the surface of the alignment layer, the polymerizable liquid crystal compound in the liquid crystal composition is formed in a nematic alignment in a liquid crystal state, and then the polymerizable liquid crystal compound is fixed by curing to form the retardation layer.

In this case, the formation of the retardation layer can be carried out in the same manner as the formation of the cholesteric liquid crystal layer, except that no chiral agent is added to the liquid crystal composition. However, during the formation of the nematic alignment after applying the liquid crystal composition, the heating temperature is preferably 50° C. to 120° C., and more preferably 60° C. to 100° C.

The retardation layer may be a layer formed by applying a composition including a high-molecular liquid crystal compound on the transparent substrate, the temporary support, the surface of the alignment layer or the like, forming the nematic alignment in a liquid crystal state, cooling the composition, and then obtained by immobilizing the alignment.

The thickness of the retardation layer is not limited, but is preferably 0.2 to 300 μm, more preferably 0.5 to 150 μm, and even more preferably 1.0 to 80 μm. The thickness of the retardation layer formed of the liquid crystal composition is not particularly limited, and is preferably 0.2 to 10 μm, more preferably 0.5 to 5.0 μm, and even more preferably 0.7 to 2.0 μm.

In the retardation layer, for example, a slow axis inclined at an angle α is set with respect to an axis of the retardation layer in any direction. The direction of the slow axis can be set by, for example, rubbing treatment on an alignment film serving as the underlayer of the retardation layer.

The reflection film according to the embodiment of the present invention may include a layer in addition to the selective reflection layer, the polarization conversion layer, and the retardation layer. For example, the reflection film may include a transparent substrate, an adhesive layer, or the like.

For example, in the example illustrated in FIG. 1, the reflection film 10 includes the transparent substrate 18 that is arranged on the side opposite to the selective reflection layer 11 of the retardation layer 16. The transparent substrate 18 supports the retardation layer 16, the selective reflection layer 11 (cholesteric liquid crystal layer), and the polarization conversion layer 14. The transparent substrate 18 may be used to as a support for forming the retardation layer 16, the selective reflection layer 11 (cholesteric liquid crystal layer), and the polarization conversion layer 14.

The reflection film may have a thin film-shape, a sheet-shape, and the like. The reflection film may have a roll-shape as a thin film before used for the windshield glass.

All of the transparent substrate, the adhesive layer, and the like are preferably transparent in the visible light range.

In addition, it is preferable that all of the transparent substrate, the adhesive layer, and the like preferably have low birefringence. The term "low birefringence" means that a front phase difference in a wavelength range where the reflection film in the windshield glass according to the embodiment of the present invention exhibits the reflection is 10 nm or less. This front phase difference is preferably 5 nm or less. Furthermore, all of the support, the adhesive layer, and other components preferably have a small difference in a refractive index from the average refractive index (in-plane average refractive index) of the selective reflection layer.

<Transparent Substrate>

The transparent substrate can also be used as a substrate for forming the selective reflection layer. The transparent substrate used for forming the selective reflection layer may be a temporary support that is peeled off after the formation of the selective reflection layer. Therefore, the transparent substrate may not be included in the completed reflection film and windshield glass. In a case where the completed reflection film or windshield glass includes the transparent substrate instead of peeling off as the temporary support, the transparent substrate is preferably transparent in the visible light range.

Materials of the transparent substrate are not limited. Examples of the transparent substrate include plastic films of polyester such as polyethylene terephthalate (PET), polycarbonate, an acrylic resin, an epoxy resin, polyurethane, polyamide, polyolefin, cellulose derivative, and silicone. As the temporary support, glass may be used in addition to the plastic films.

A thickness of the transparent substrate may be approximately 5.0 to 1000 µm, is preferably 10 to 250 µm, and more preferably 15 to 90 µm.

Here, as the example illustrated in FIG. 3, in a case where the transparent substrate 18 is arranged on the second glass plate 30 side, that is, arranged on the outside of the vehicle, the transparent substrate 18 preferably contains an ultraviolet absorber.

In a case where the transparent substrate 18 contains the ultraviolet absorber, deterioration of the reflection film (selective reflection layer) by ultraviolet light can be suppressed.

<Laminated Glass>

The windshield glass may have a laminated glass configuration. The windshield glass according to the embodiment of the present invention is a laminated glass, and preferably includes the reflection film according to the embodiment of the present invention described above between a first glass plate and a second glass plate.

The windshield glass may have a configuration in which the reflection film is arranged between the first glass plate and the second glass plate. However, the windshield glass preferably has a configuration in which an interlayer film (interlayer film sheet) is provided on at least one of between the first glass plate and the reflection film, or between the reflection film and the second glass plate.

In the windshield glass, as an example, the second glass plate is disposed on a side (outside the vehicle) opposite to a side on which an image is seen in the HUD, and the first glass plate is disposed on the side on which an image is seen (inside the vehicle). In the windshield glass according to the embodiment of the present invention, the term "first" and "second" in the first glass plate and the second glass plate have no technical meanings, and are provided for convenience in order to distinguish two glass plates. Therefore, the second glass plate may be disposed inside the vehicle and the first glass plate may be disposed outside the vehicle.

As glass plates such as the first glass plate and the second glass plate, a glass plate generally used in the windshield glass can be used. For example, a glass plate having a visible light transmittance of 80% or less such as 73% or 76%, such as green glass having high heat shielding properties, may be used. Even in a case where a glass plate having a low visible light transmittance is used as described above, a windshield glass having a visible light transmittance of 70% or more in a position of the reflection film can be produced by using the reflection film according to the embodiment of the present invention.

The thickness of the glass plate is not particularly limited, and may be approximately 0.5 to 5.0 mm and is preferably 1.0 to 3.0 mm and more preferably 2.0 to 2.3 mm. Materials and thicknesses of the first glass plate and the second glass plate may be the same as or different from each other.

The windshield glass including the laminated glass structure can be manufactured by using a well-known producing method of a laminated glass.

In general, the laminated glass can be produced by a method of interposing the interlayer film for a laminated glass between two glass plates, repeating a heating treatment and a pressurizing treatment (pressurization using rubber rollers, or the like) several times, and finally performing the heating treatment under a pressurizing condition by using an autoclave.

As an example, the windshield glass having the laminated glass configuration including the reflection film and the interlayer film may be produced by the above described method of producing a laminated glass after the reflection film is formed on a surface of the glass plate, or may be produced by the above described method of producing a laminated glass using the interlayer film for the laminated glass including the above described reflection film.

In a case where the reflection film is formed on a surface of a glass plate, the glass plate on which the reflection film is provided may be either the first glass plate or the second glass plate. In this case, the reflection film may be laminated and bonded to a glass plate with an adhesive (heat seal layer), for example.

(Interlayer Film)

The interlayer film 36 prevents the glass from being broken and scattering in a vehicle in the event of an accident, and bonds the reflection film 10 and the first glass plate 28 together in the example of FIG. 3.

As the interlayer film (interlayer film sheet), any known interlayer film used as an interlayer film in the laminated glass can be used. For example, a resin film including a resin selected from the group consisting of polyvinylbutyral (PVB), an ethylene-vinyl acetate copolymer, and a chlorine-containing resin can be used. The resin is preferably a main component of the interlayer film. The main component refers to a component occupying 50% by mass or more of the interlayer film.

Among the resins, polyvinylbutyral and an ethylene-vinyl acetate copolymer are preferable, and polyvinylbutyral is more preferable. The resin is preferably a synthesis resin.

Polyvinylbutyral can be obtained by acetalizing polyvinyl alcohol with butyl aldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80% to 99.8% by mol is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has good moldability, and the rigidity of the resin film does not become too large. Thus, a good workability is achieved. A more preferable lower limit thereof is 500 and a more preferable upper limit is 2,000.

Further, a thickness of the interlayer film 36 is not limited, and the thickness depending on the forming materials or the like may be set in the same manner as the interlayer film of the known windshield glass.

In the windshield glass 24, the heat seal layer 38 is provided between the reflection film 10 and the second glass plate 30, and the reflection film 10 and the first glass plate 28 are attached to each other via the interlayer film 36, but the configuration of the windshield glass 24 is not limited thereto. That is, the heat seal layer may be provided between the reflection film 10 and the first glass plate 28, and an interlayer film may be provided between the reflection film 10 and the second glass plate 30.

In addition, the windshield glass 24 may not be configured to include the interlayer film 36, and may be configured to use the heat seal layer 38 to attach the reflection film 10 to the first glass plate 28, and attach the reflection film 10 to the second glass plate 30.

(Interlayer Film Including Reflection Film)

The interlayer film for the laminated glass including the reflection films can be formed with the reflection films being laminated and bonded onto a surface of the above described interlayer film. Alternatively, the reflection film may be sandwiched between the two interlayer films described above. The two interlayer films may be the same as each other or different from each other, and the same interlayer films are preferable.

A well-known laminating and bonding method can be used to laminate and bond the reflection film to the interlayer film, and a laminating process is preferably used. It is preferable that the laminating process is performed under heating and pressurizing conditions to some extent so that the laminate and the interlayer film are not peeled off from each other after processed.

In order to stably perform the laminating, a film surface temperature of a side on which the interlayer film is adhered is preferably 50° C. to 130° C. and more preferably 70° C. to 100° C.

The pressurization is preferably performed at the time of laminating. The pressurizing condition is not limited, but is preferably lower than 2.0 kg/cm$^2$ (less than 196 kPa), more preferably 0.5 to 1.8 kg/cm$^2$ (49 kPa to 176 kPa), and still more preferably 0.5 to 1.5 kg/cm$^2$ (49 kPa to 147 kPa).

In a case where the reflection film includes a support (transparent substrate), the support may be peeled off at the same time as laminating, immediately after laminating, or immediately before laminating. That is, the reflection film attached to the interlayer film obtained after laminating may not have the support.

An example of a method of producing an interlayer film including the reflection film includes (1) a first step of laminating and bonding the reflection film to a surface of a first interlayer film to obtain a first laminate, and (2) a second step of laminating and bonding a second interlayer film on a surface opposite to the surface to which the first interlayer film of the reflection film in the first laminate is laminated and bonded.

For example, in the first step, the reflection film and the first interlayer film are laminated and bonded to each other so that the support and the first interlayer film do not face each other. Next, the support is peeled off from the reflection film. Furthermore, in the second step, the second interlayer film is laminated and bonded on the surface from which the support has been peeled off. As a result, it possible to produce the interlayer film including the reflection film having no support. In addition, the interlayer film including this reflection film can be used to produce the laminated glass in which the reflection film does not have the support.

In order to stably peel the support without breakage or other damage, the temperature of the support in a case where the support is peeled off from the reflection film is preferably 40° C. or higher, and more preferably 40° C. to 60° C.

(Heat Seal Layer)

The heat seal layer (adhesive layer) 38 is, for example, a layer consisting of a coating-type adhesive. In the example illustrated in FIG. 3, the reflection film 10 is attached to the second glass plate 30 via the heat seal layer 38. In the windshield glass according to the embodiment of the present invention, the reflection film 10 may be attached to the second glass plate 30 via the interlayer film instead of the heat seal layer 38. In addition, in a case where the reflection film 10 is smaller than the interlayer film 36 via which the first glass plate 28 and the reflection film 10 are attached, the interlayer film 36 may be used to attach the reflection film 10 to the second glass plate 30.

The heat seal layer 38 is not limited as long as the heat seal layer 38 can secure the transparency required for the windshield glass 24 and can attach the reflection film 10 to the glass with the necessary adhesive force, and various known coating-type adhesives are available. The heat seal layer 38 may be the same as the interlayer film 36 such as PVB. In addition to this, an acrylate-based adhesive and the like can also be used for the heat seal layer 38.

The heat seal layer 38 may be formed of an adhesive.

From the viewpoint of the curing-type, adhesives are classified into hot-melt adhesives, thermosetting adhesives, photocuring adhesives, reaction curing adhesives, and pressure-sensitive adhesives requiring no curing. In addition, as the adhesives of any type, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, and polyvinylbutyral-based compounds can be used.

From viewpoints of workability and productivity, a photocuring method is preferable as a curing method, and from viewpoints of optical transparency and heat resistance, the acrylate-based, urethane acrylate-based, and epoxy acrylate-based compounds are preferably used as the material.

The heat seal layer 38 may be formed by using a highly transparent adhesive transfer tape (OCA tape). A commercially available product for an image display device, in particular, a commercially available product for a surface of an image display portion of an image display device may be used as the highly transparent adhesive transfer tape. Examples of commercially available products include pressure sensitive adhesive sheets (such as PD-S1) manufactured by Panac Co., Ltd., and pressure sensitive adhesive sheets of MHM series manufactured by NICHIEI KAKOH CO., LTD.

The thickness of the heat seal layer 38 is also not limited. Therefore, depending on the material for forming the heat seal layer 38, the thickness at which sufficient adhesive force can be obtained may be appropriately set.

Here, in a case where the heat seal layer 38 is excessively thick, the reflection film 10 may not be attached to the first glass plate 28 or the second glass plate 30 while the leveling is sufficiently maintained. In consideration of this point, the thickness of the heat seal layer 38 is preferably 0.1 to 800 μm, and more preferably 0.5 to 400 μm.

Next, a head-up display (HUD) including the reflection film according to the embodiment of the present invention will be described.

The head-up display according to the embodiment of the present invention is a head-up display system including
the windshield glass described above, and
a projector that emits projection light onto the first glass plate side of the windshield glass.

Figure 5:
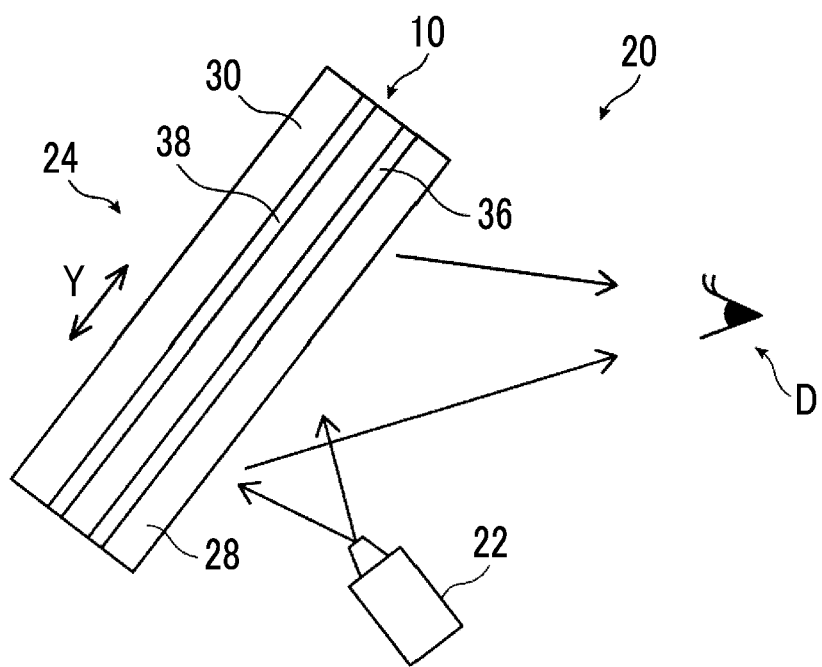
FIG. 5 is a schematic diagram illustrating an example of a head-up display including the reflection film of the present invention.

FIG. 5 illustrates an example of the head-up display according to the present invention.

A HUD 20 illustrated in FIG. 5 includes a windshield glass 24 and a projector 22. The HUD 20 is used in a vehicle such as a passenger car.

The windshield glass 24 has the same configuration as the windshield glass 24 illustrated in FIG. 3.

The HUD 20 in which the reflection film 10 according to the embodiment of the present invention is used, the projector 22 emits p-polarized projection light, and the reflection film 10 reflects the p-polarized light to display a screen image.

Specifically, in the reflection film 10, the polarization conversion layer 14 first converts the projection light of the incident p-polarized projection light into circularly polarized light. Next, the selective reflection layer 11 (cholesteric liquid crystal layer) selectively reflects the circularly polarized light, and the reflected light is incident in the polarization conversion layer 14 again. Furthermore, the polarization conversion layer 14 converts the circularly polarized light into p-polarized light. Thereby, the reflection film 10 reflects the incident p-polarized projection light as p-polarized light.

Therefore, the polarization conversion layer 14 is set to convert the incident p-polarized light into circularly polarized light in a turning direction, which is reflected by the selective reflection layer 11, according to the sense of the circularly polarized light that is selectively reflected by the selective reflection layer 11 (cholesteric liquid crystal layer). That is, in a case where the selective reflection layer 11 selectively reflects the dextrorotatory circularly polarized light, the polarization conversion layer 14 is set to make the incident p-polarized light dextrorotatory circularly polarized light. By contrast, in a case where the selective reflection layer 11 selectively reflects the dextrorotatory circularly polarized light, the polarization conversion layer 14 is set to make the incident p-polarized light the dextrorotatory circularly polarized light.

In the HUD 20, the projector 22 preferably emits the p-polarized projection light to the windshield glass 24 (second glass plate 30). The projection light is emitted to the windshield glass 24 by the projector 22 and converted into p-polarized light, so that the reflection of the projection light by the second glass plate 30 and first glass plate 28 of the windshield glass 24 can be significantly reduced, and disadvantages such as observation of a double image can be suppressed.

The projector 22 preferably emits the p-polarized projection light to the windshield at the Brewster's angle. Therefore, the reflection of the projection light by the second glass plate 30 and the first glass plate 28 is eliminated, which allows display of a clearer screen image.

<Projector>

The "projector" is a "device projecting light or a screen image", includes a "device projecting a drawn image", and emits projection light carrying and supporting an image to be displayed. In the HUD of the present invention, the projector preferably preferably emits p-polarized projection light.

In the HUD, the projector may be arranged so that the p-polarized projection light carrying and supporting a screen image to be displayed can be incident into the reflection film in the windshield glass at an obliquely incident angle.

In the HUD, the projector includes a drawing device, and preferably displays, as a virtual image by reflection, a screen image (real image) drawn on a small intermediate image screen using a combiner.

A known projector used for the HUD can be used as long as the projector can emit p-polarized projection light. In addition, in the projector, an imaging distance of the virtual image, that is, a virtual image formation position is preferably variable.

Examples of a method of changing an imaging distance of a virtual image in the projector include a method in which a surface (screen) on which a screen image is generated is moved (see JP2017-21302A), a method in which a plurality of optical paths having different optical path lengths are changed (see WO2015/190157A), a method in which the optical path length is changed by inserting and/or moving mirrors, a method in which the focal length is changed by using an assembled lens as an imaging lens, a method in which the projector 22 is moved, a method in which a plurality of projectors having different imaging distances of virtual images are changed and used, and a method in which a variable-focal-length lens is used (see WO2010/116912A).

The projector may be a projector in which the imaging distance of a virtual image is continuously changeable or a projector in which the imaging distance of a virtual image can be changed at two or three more points.

Herein, the imaging distances of at least two virtual images among virtual images of projection light from the projector are preferably different from each other by 1 m or more. Therefore, in a case where the imaging distance of a virtual image can be continuously changed by the projector, the imaging distance of a virtual image is preferably changeable by 1 m or more. Such a projector is preferably used because the projector can suitably handle the case where the distance of visual line of the driver is considerably different between a normal speed run on the general road and a high speed run on the expressway.

(Drawing Device)

The drawing device may itself be a device displaying a screen image or a device emitting light capable of drawing a screen image.

In the drawing device, light from the light source may be adjusted by a drawing method such as an optical modulator, laser luminance modulation unit, optical deflection unit for drawing, or the like. The drawing device includes a light source, and means a device including an optical modulator, laser luminance modulation unit, optical deflection unit for drawing, or the like according to the drawing method.

(Light Source)

Light sources are not limited, and known light sources used in projectors, drawing devices, and displays, such as light-emitting diodes (LEDs), organic light-emitting diodes (OLEDs), discharge tubes, and laser light sources, may be used.

Among these, LEDs and discharge tubes are preferred since they are suitable for a light source of a drawing device that emits linearly polarized light, and LEDs are particularly preferred. As the luminescence wavelength is not continuous in the visible light range, LEDs are suitable for combination with a combiner in which a cholesteric liquid crystal layer exhibiting selective reflection in a specific wavelength range is used as described later.

(Drawing Method)

The drawing method can be selected according to a light source to be used, and the like, and is not particularly limited.

Examples of the drawing method include a fluorescent display tube, a liquid crystal display (LCD) method using a liquid crystal, a liquid crystal on silicon (LCOS) method, DLP (Digital Light Processing) (registered trademark) method, a scanning method using a laser, and the like. The drawing method may be a method using a fluorescent display tube integrated with a light source. The LCD method is preferred as the drawing method.

In the LCD method and the LCOS method, light beams having respective colors are modulated and multiplexed by the optical modulator, and a light beam is emitted from a projection lens.

The DLP method is a display system using a digital micromirror device (DMD), in which micromirrors corresponding to the number of pixels are arranged, the drawing is performed and light is emitted from the projection lens.

The scanning method is a method of scanning a screen with light rays and imaging using an afterimage in eyes. For example, the description of JP1995-270711A (JP-H7-270711A) and JP2013-228674A can also be referred to. In the scanning method using the laser, a luminance modulated laser beam having each color of, for example, red light, green light, and blue light may be bundled into one ray of light by a multiplexing optical system or a condenser lens, the scanning may be performed with the ray of light by the optical deflection unit, and the ray of light may be drawn on an intermediate image screen to be described later.

In the scanning method, the luminance modulation of a laser beam having each color of, for example, red light, green light, and blue light may be performed directly by changing an intensity of the light source, or may be performed by an external modulator. Examples of the optical deflection unit include a galvanometer mirror, a combination of a galvanometer mirror and a polygon mirror, and a micro electro mechanical system (MEMS), and among these, MEMS is preferable. The scanning method includes a random scan method, a raster scan method, or the like, and a raster scan method is preferably used. In the raster scan method, the laser beam can be driven, for example, with a resonance frequency in a horizontal direction and with a saw-tooth wave in a vertical direction. Since the scanning method does not require the projection lens, it is easy to miniaturize the device.

Light emitted from the drawing device may be linearly polarized light or natural light (non-polarized light).

In a drawing device using a drawing method of the LCD method or the LCOS method and a drawing device using a laser light source, light emitted from the drawing device is essentially linearly polarized light. In the case where a drawing device in which the emitted light is linearly polarized light and includes light beams having a plurality of wavelengths (colors), the polarization directions (transmission axis directions) of light in a plurality of wavelengths are preferably the same as each other. Known commercially available drawing devices include a device that has non-uniform polarization directions in wavelength ranges of red light, green light, and blue light included in the emitted light (see JP2000-221449A). Specifically, an example is known that the polarization direction of the green light is orthogonal to the polarization direction of the red light and the polarization direction of the blue light.

As described above, in the HUD according to the embodiment of the present invention, the projection light emitted by the projector is preferably p-polarized light.

(Intermediate Image Screen)

As described above, the drawing device may use an intermediate image screen. The "intermediate image screen" is a screen on which a screen image is drawn. That is, in a case where light emitted from the drawing device is not yet visible as a screen image, the drawing device forms a screen image visible on the intermediate image screen using the light. The screen image drawn on the intermediate image screen may be projected on the combiner by light transmitted through the intermediate image screen, and may be reflected on the intermediate image screen and projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarized light incident on the intermediate image screen are in disorder, and color unevenness or the like is likely to occur in the combiner (reflection film). However, by using a phase difference film having a predetermined phase difference, the problem of occurrence of color unevenness can be reduced.

It is preferable that the intermediate image screen has a function of spreading and transmitting incident rays. This is because an enlarged projection image can be displayed. An example of the intermediate image screen includes a screen composed of a microlens array. The microlens array used in the HUD is described in, for example, JP2012-226303A, JP2010-145745A, and JP2007-523369A.

The projector may include a reflecting mirror which adjusts an optical path of projection light formed by the drawing device.

Regarding HUDs using the windshield glass as the reflection film, JP1990-141720A (JP-H02-141720A), JP1998-096874A (JP-H10-096874A), JP2003-98470A, U.S. Pat. No. 5,013,134A, and JP2006-512622A can be referred to.

The windshield glass is particularly effective for the HUD used in combination with a projector using lasers, LEDs, or organic light-emitting diodes (OLEDs) in which a luminescence wavelength is not continuous in a visible light range as a light source. This is because, the selective reflection center wavelength of the cholesteric liquid crystal layer can be adjusted in accordance with each luminescence wavelength. In addition, the windshield glass can also be used for projection of a display such as a liquid crystal display device (LCD) in which display light is polarized light.

[Projection Light (Incident Light)]

The incident light is preferably incident at an obliquely incident angle of 45° to 70° with respect to the normal line of the reflection film. The Brewster's angle at an interface between the glass having a refractive index of approximately 1.51 and the air having a refractive index of 1 is approximately 56°, and the p-polarized light is allowed to incident in the range of the angle; thereby, an image display with the small amount of the reflected light of the incident light for the projection image display, which is reflected from the surface of the windshield glass on the visible side with respect to the selective reflection layer, and a decreased effect of a double image can be achieved.

The above described angle is also preferably set to 50° to 65°. At this time, it is preferable to employ a configuration in which an observation of the projection image can be performed at an angle of 45° to 70°, preferably 50° to 65° on a side opposite to a side on which light is incident, with respect to the normal line of the selective reflection layer in the side on which projection light is incident.

The incident light may be incident from any direction of upwards, downwards, rightwards, and leftwards of the windshield glass, and may be determined in accordance with a visible direction. For example, the incident light is preferably incident at an obliquely incident angle from the bottom during the use.

In addition, the reflection film of the windshield glass is preferably disposed to reflect the incident p-polarized light.

As described above, the projection light in a case of displaying the projection image in the HUD according to the embodiment of the present invention is preferably p-polarized light vibrating in the direction parallel to the incident surface.

In a case where the light emitted from the projector is not linearly polarized light, the light may be converted into p-polarized light by providing a linearly polarized light film (polarizer) on the light emitting side of the projector, or the light may be converted into p-polarized light by a known method of using the linearly polarized light film or the like on an optical path between the projector and the windshield glass. In this case, it is considered that a member converting projection light that is not linearly polarized light into p-polarized light is also included in the projector of the HUD according to the embodiment of the present invention.

As described above, in the projector whose polarization direction is not uniform in the wavelength ranges of red light, green light, and blue light of the emitted light, the polarization direction is preferably adjusted in a wavelength selective manner, and light is incident in all color wavelength ranges as p-polarized light.

As described above, the HUD (projector) may be a projection system in which a virtual image formation position is variable. The variable virtual image formation position enables the driver to visually confirm the virtual image more comfortably and conveniently.

The virtual image formation position is a position at which the driver of the vehicle can visually confirm a virtual image, and for example, typically, a position positioned 1000 mm or more away from the front of the windshield glass as seen by a driver.

A vertical direction Y of the windshield glass 24 is a direction corresponding to the vertical direction of a vehicle or the like in which the windshield glass 24 is placed, and the direction is defined such that the ground side is a lower side and a side opposite to the lower side is an upper side. In the case where the windshield glass 24 is placed in the vehicle or the like, the windshield glass 24 may be arranged in an inclined manner for the sake of convenience of structure or design, and in this case, the vertical direction Y corresponds to a direction along a surface 25 of the windshield glass 24. The surface 25 is the outer surface side of the vehicle.

The present invention is fundamentally configured as described above. Although the reflection film, the windshield glass, and the head-up display system (HUD) according to the embodiment of the present invention have been described in detail above, the present invention is not limited to the above described embodiment, and various improvements and modifications may be made without departing from the spirit of the present invention.

EXAMPLES

The features of the present invention will be described in detail with reference to the following examples. Materials, reagents, amounts of substances and percentages thereof, and operations illustrated in the following examples can be suitably changed within a range not departing from the gist of the present invention. Therefore, the ranges of the present invention are not limited to the following examples.

<Preparation of Coating Liquid>

(Cholesteric Liquid Crystal Layer-Forming Coating Liquid)

Regarding a plurality of cholesteric liquid crystal layer-forming coating liquid for forming cholesteric liquid crystal layers (B1, B2, G1 to G5, R1 to R6, IR1 to IR3) each of which has a selective reflection center wavelength as a desired wavelength illustrated in Table 1 below, the following components were mixed to prepare each cholesteric liquid crystal layer-forming coating liquid having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent LC756 (manufactured by BASF SE) | adjusted in accordance with the target reflection wavelength |
| Polymerization initiator IRGACURE OXE01 (manufactured by BASF SE) | 1.0 part by mass |
| Solvent (methyl ethyl ketone) | the amount of a solute concentration of 20% by mass |

Mixture 1

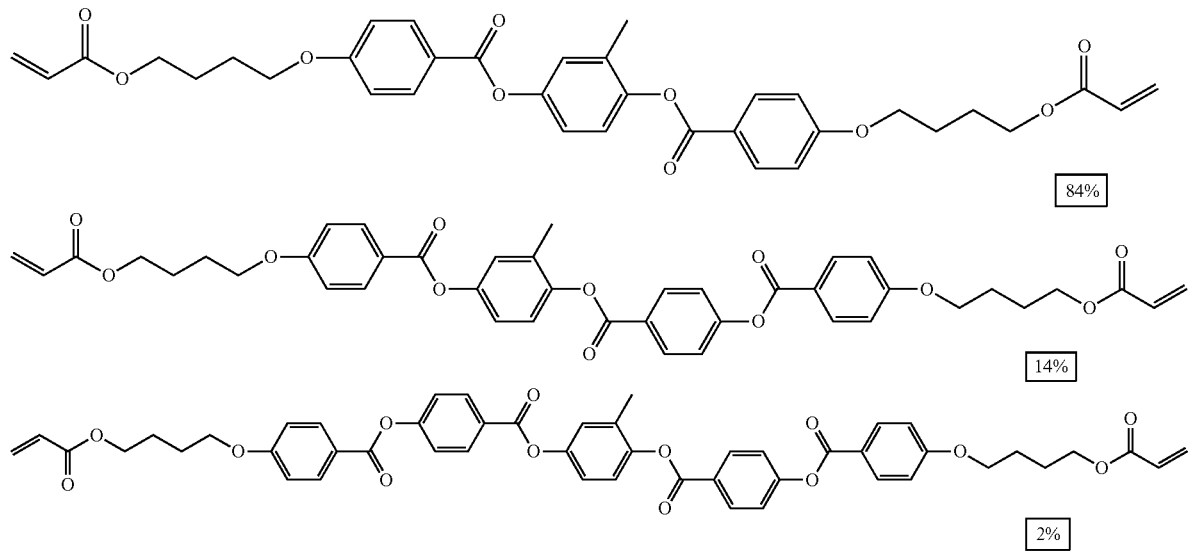

The numerical value is represented by % by mass

Alignment Control Agent 1

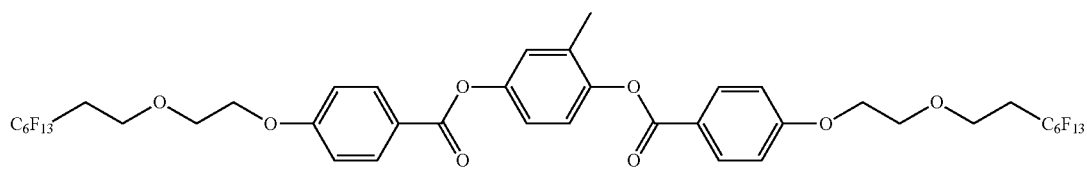

Alignment Control Agent 2

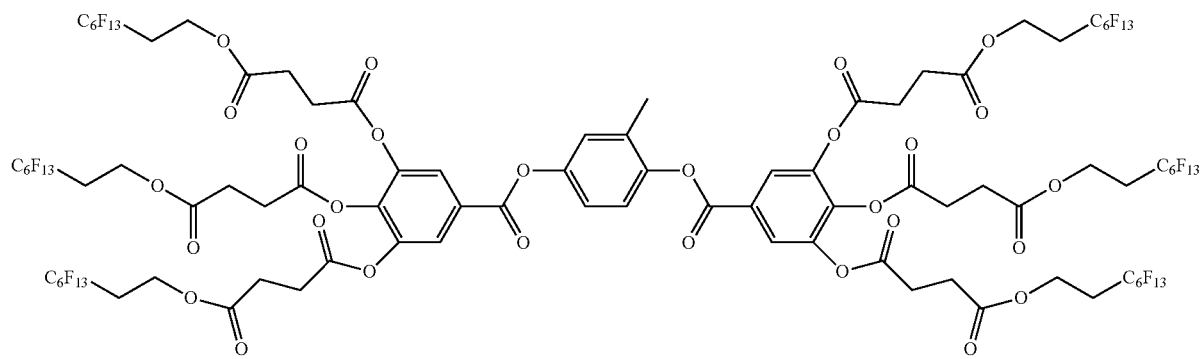

The prescription amount of the dextrorotatory chiral agent LC756 having the above described coating liquid composition was adjusted to prepare each cholesteric liquid crystal layer-forming coating liquid.

A single cholesteric liquid crystal layer having a film thickness of 3 μm was produced on a temporary support in the same manner as the production of a half-mirror described below by using each cholesteric liquid crystal layer-forming coating liquid, and the reflection characteristics of light in the visible light range.

As a result, it was confirmed that each produced cholesteric liquid crystal layers was a dextrorotatory circularly polarized light reflection layer, and the selective reflection center wavelength (center wavelengths) as a wavelength illustrated in Table 1.

(Cholesteric Liquid Crystal Layer-Forming Coating Liquid 2)

Regarding a plurality of cholesteric liquid crystal layer-forming coating liquid for forming cholesteric liquid crystal layers (B3, G6, R7, IR4) each of which has a selective reflection center wavelength as a desired wavelength illustrated in Table 1 below, the following components were mixed to prepare each narrow-band cholesteric liquid crystal layer-forming coating liquid having the following composition.

| (Narrow-Band Cholesteric Liquid Crystal Layer-forming Coating Liquid) | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator IRGACURE OXE01 (manufactured by BASF SE) | 1.0 part by mass |
| Alignment control agent 1 | 0.01 parts by mass |
| Alignment control agent 3 (Fluorine-based horizontal alignment agent 3) | 0.01 parts by mass |

-continued

| (Narrow-Band Cholesteric Liquid Crystal Layer-forming Coating Liquid) | |
|---|---|
| Dextrorotatory chiral agent LC756 (manufactured by BASF SE) | adjusted in accordance with the target selective reflection center wavelength |
| Solvent (methyl ethyl ketone) | the amount of a solute concentration of 20% by mass |

Rod-Like Liquid Crystal Compound 101

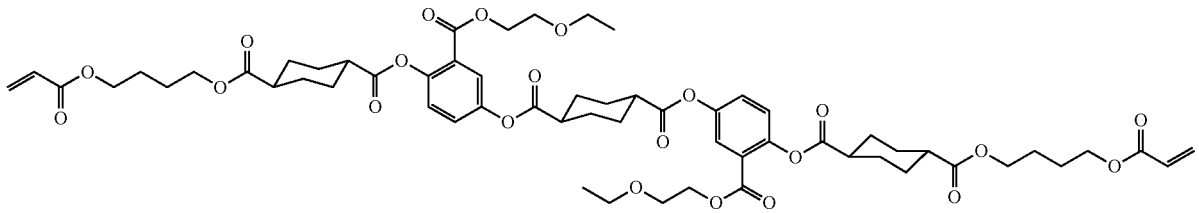 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]

Rod-Like Liquid Crystal Compound 102

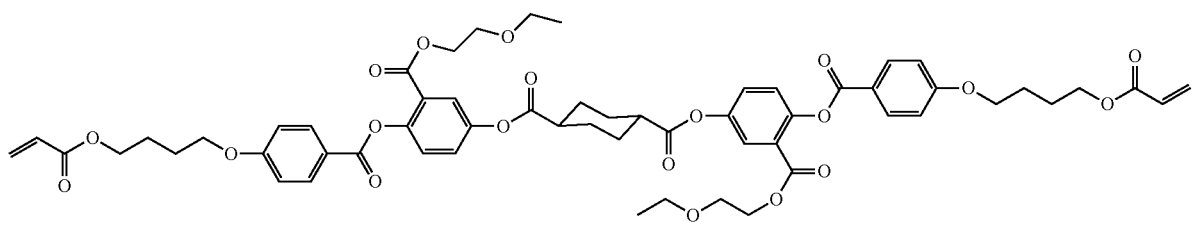 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]

Rod-Like Liquid Crystal Compound 201
Rod-Like Liquid Crystal Compound 202
Rod-Like Liquid Crystal Compound 201

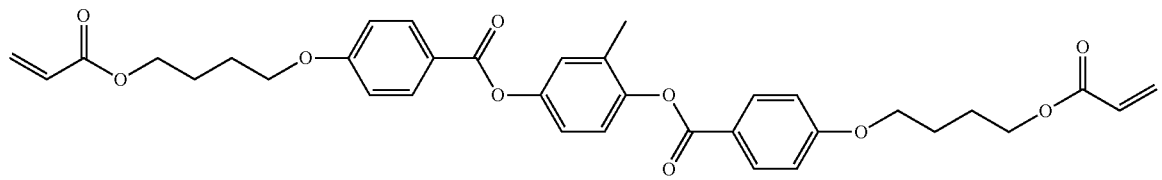 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Liquid Crystal Compound 202

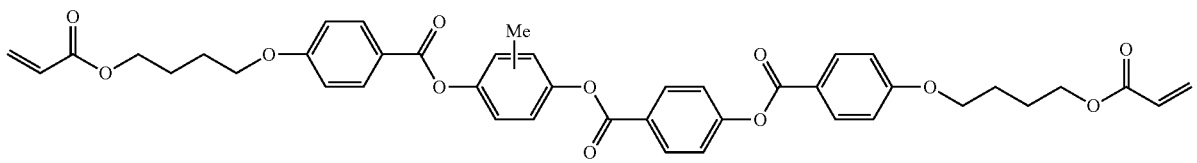

Alignment Control Agent 3

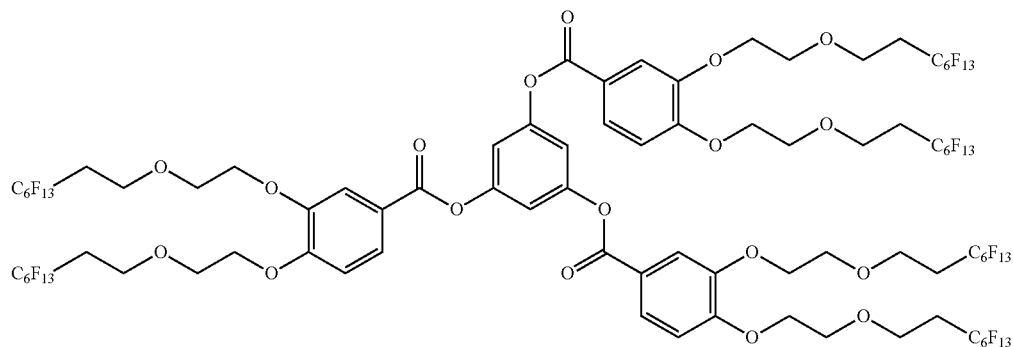

The prescription amount of the dextrorotatory chiral agent LC756 in the above-described narrow-band cholesteric liquid crystal layer-forming composition was adjusted to prepare each cholesteric liquid crystal layer-forming coating liquid.

A single cholesteric liquid crystal layer having a film thickness of 3 μm was produced on a temporary support in the same manner as the production of a half-mirror described below by using each cholesteric liquid crystal layer-forming coating liquid, and the reflection characteristics of light in the visible light range.

As a result, it was confirmed that each produced cholesteric liquid crystal layers was a dextrorotatory circularly polarized light reflection layer, and the selective reflection center wavelength (center wavelengths) as a wavelength illustrated in Table 1.

TABLE 1

| | Selective reflection center wavelength nm |
|---|---|
| B1 | 450 |
| B2 | 481 |
| B3 | 450 |
| G1 | 680 |
| G2 | 710 |
| G3 | 600 |
| G4 | 540 |
| G5 | 550 |
| G6 | 550 |
| R1 | 820 |
| R2 | 780 |
| R3 | 760 |
| R4 | 650 |

TABLE 1-continued

| | Selective reflection center wavelength nm |
|---|---|
| R5 | 613 |
| R6 | 820 |
| R7 | 655 |
| IR1 | 820 |
| IR2 | 800 |
| IR3 | 843 |
| IR4 | 740 |

(Cholesteric Liquid Crystal Layer-Forming Coating Liquid C1)

Regarding a cholesteric liquid crystal layer-forming coating liquid C1 for forming a cholesteric liquid crystal layer C1 having a plurality of selective reflection center wavelengths, the following components were mixed to prepare a cholesteric liquid crystal layer-forming coating liquid C1 having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent LC756 | adjusted to match the target wavelength |
| Dextrorotatory isomerization chiral agent 1 | adjusted to match the target wavelength |
| Polymerization initiator PM7957 | 1 part by mass |
| Solvent (methyl ethyl ketone) | the amount of a solute concentration of 20% by mass |

Dextrorotatory Isomerization Chiral Agent 1

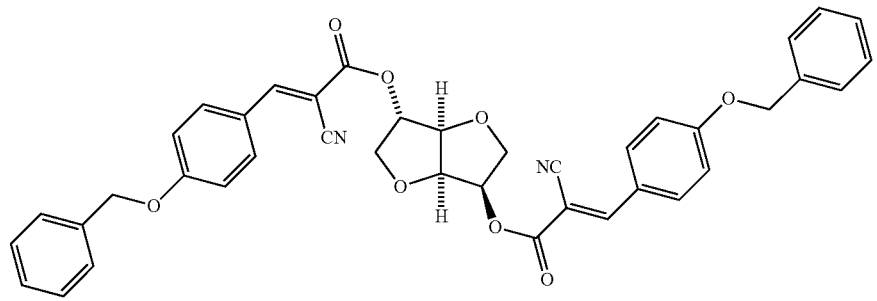 [SMILES: N#C/C(=C\c1ccc(OCc2ccccc2)cc1)C(=O)O[C@H]1CO[C@H]2[C@@H]1OC[C@H]2OC(=O)/C(C#N)=C/c1ccc(OCc2ccccc2)cc1]

Polymerization Initiator PM7957

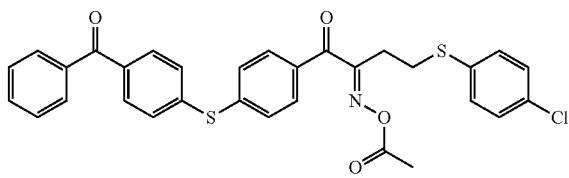 [SMILES: CC(=O)O/N=C(\CCSc1ccc(Cl)cc1)C(=O)c1ccc(Sc2ccc(C(=O)c3ccccc3)cc2)cc1]

(Retardation Layer-Forming Coating Liquid)
The following components were mixed to prepare a retardation layer-forming coating liquid having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.01 parts by mass |
| Polymerization initiator IRGACURE OXE01 (manufactured by BASF SE) | 1.0 part by mass |
| Solvent (methyl ethyl ketone) | the amount of a solute concentration of 20% by mass |

(Polarization Conversion Layer-Forming Coating Liquid)
The following components were mixed to prepare a polarization conversion layer-forming coating liquid having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent LC756 (manufactured by BASF SE) | adjusted in accordance with the target number of pitches and the reflection wavelength that matches the film thickness |
| Polymerization initiator IRGACURE OXE01 (manufactured by BASF SE) | 1.0 part by mass |
| Solvent (methyl ethyl ketone) | the amount of a solute concentration of 20% by mass |

In a case where the prescription amount of the dextrorotatory chiral agent LC756 having the above described composition of the coating liquid was adjusted to obtain the cholesteric liquid crystal layer, the polarization conversion layer-forming coating liquid prepared to have a desired selective reflection center wavelength k. The selective reflection center wavelength λ was determined by measuring a single cholesteric liquid crystal layer having a film thickness of 3 μm, which is produced on the temporary support, by FTIR (Spectrum Two manufactured by PerkinElmer Inc.).

The film thickness d of the helical structure can be represented by "the pitch P×the number of pitches of the helical structure". As described above, the pitch P of the helical structure is a length of one pitch in the helical structure, and one pitch is that the director of the liquid crystal compound helically aligned is rotated by 360°. In the cholesteric liquid crystal layer, the selective reflection center wavelength λ coincides with "the length P of one pitch×the average refractive index n in the plane" (λ=P×n). Therefore, the pitch P is "the selective reflection center wavelength λ/the average refractive index n in the plane" (P=λ/n).

According to this, in a case where the cholesteric liquid crystal layer was obtained, a polarization conversion layer-forming coating liquid was prepared so that the selective reflection center wavelength λ became a desired wavelength. In the formation of the polarization conversion layer described later, the polarization conversion layer-forming coating liquid was applied to have a desired film thickness, thereby forming a polarization conversion layer, and the number of pitches was determined.

The combinations of the number of pitches, the film thickness, and the selective reflection center wavelength λ (center wavelength λ) of the target polarization conversion layer of the prepared polarization conversion layer-forming coating liquid are illustrated in Table 2.

TABLE 2

| | Polarization conversion layer | | |
|---|---|---|---|
| | The number of pitches | Film thickness μm | Center wavelength λ |
| Example 1 | 0.265 | 1.7 | 10000 |
| Example 2 | 0.332 | 2.2 | 8000 |
| Example 3 | 0.279 | 1.6 | 9500 |
| Example 4 | 0.279 | 1.6 | 9500 |
| Example 5 | 0.279 | 1.6 | 9500 |
| Example 6 | 0.265 | 1.7 | 10000 |
| Comparative Example 1 | Not provided (retardation layer) | | |
| Comparative Example 2 | Not provided (retardation layer) | | |
| Comparative Example 3 | Not provided (retardation layer) | | |
| Comparative Example 4 | 0.379 | 1.7 | 7000 |
| Comparative Example 5 | 0.265 | 1.7 | 10000 |
| Comparative Example 6 | Not provided (retardation layer) | | |
| Comparative Example 7 | Not provided (retardation layer) | | |

Example 1

<Saponification of Cellulose Acylate Film>
A cellulose acylate film having a thickness of 40 μm was produced by the same producing method as in Example 20 described in WO2014/112575A. In addition, UV-531 manufactured by Fujian Disheng Technology Co., Ltd. was added to the cellulose acylate film as an ultraviolet absorber. The addition amount was 3 per hundred resin (phr).

The produced cellulose acylate film passed through a dielectric heating roll having a temperature of 60° C., and a temperature at the film surface was increased to 40° C. Thereafter, one side of the film was coated with an alkaline solution in the composition provided as below at a coating amount of 14 ml/m² by using a bar coater and was allowed to stay under a steam-type far infrared heater (manufactured by Noritake Co., Ltd.) heated to 110° C. for 10 seconds.

Next, pure water was applied at 3 mL/m² by using a bar coater in the same manner.

Next, washing with water using a fountain coater and dewatering using an air knife were repeated three times, staying in a drying zone at 70° C. was performed for 5 seconds, and drying was performed to produce a cellulose acylate film subjected to the saponification treatment.

The in-plane phase difference of the saponified cellulose acylate film was measured by AxoScan, and the measurement result was 1 nm.

| Composition of Alkaline solution | |
|---|---|
| Potassium hydroxide | 4.7 parts by mass |
| Water | 15.7 parts by mass |
| Isopropanol | 64.8 parts by mass |

-continued

| Composition of Alkaline solution | |
|---|---|
| Surfactant (C$_{16}$H$_{33}$O(CH$_2$CH$_2$O)$_{10}$H) | 1.0 part by mass |
| Propylene glycol | 14.9 parts by mass |

<Formation of Alignment Film>

The saponified surface of the saponified cellulose acylate film (transparent support) is coated with an alignment film-forming coating liquid having a composition illustrated below by a wire bar coater at 24 mL/m$^2$, and dried with hot air at 100° C. for 120 seconds.

| Composition of Alignment Film-forming Coating Liquid | |
|---|---|
| Modified polyvinyl alcohol illustrated below | 28 parts by mass |
| Citric acid ester (AS3, manufactured by Sankyo Chemical Co., Ltd.) | 1.2 parts by mass |
| Photoinitiator (IRGACURE 2959, manufactured by BASF SE) | 0.84 parts by mass |
| Glutaraldehyde | 2.8 parts by mass |
| Water | 699 parts by mass |
| Methanol | 226 parts by mass |

(Modified Polyvinyl Alcohol)

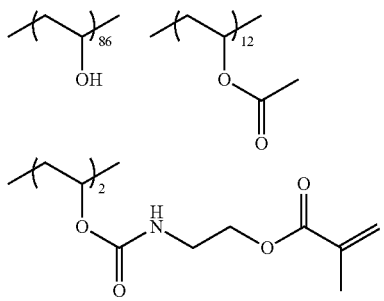

<Production of Reflection Film>

The cellulose acylate film on which the alignment film was formed was used as a support (transparent substrate).

Rubbing treatment (rayon cloth, pressure: 0.1 kgf (0.98N), rotation speed: 1000 revolutions per minute (rpm), transportation speed: 10 m/min, and the number of times: 1 round trip) was performed on one side of the support in a direction rotated 45° clockwise with respect to the long side direction of the support.

The retardation layer-forming coating liquid was applied to the rubbed surface of the alignment film on the support by a wire bar, and then dried.

Next, the coated result was placed on a hot plate at 50° C. and irradiated with ultraviolet light for 6 seconds by an electrodeless lamp "D bulb" (60 mW/cm$^2$) manufactured by Fusion UV Systems Inc. in an environment with an oxygen concentration of 1000 ppm or less, and the liquid crystalline phase was immobilized. As a result, a retardation layer having a desired front phase difference, that is, a thickness adjusted to obtain a desired retardation was obtained.

The retardation of the produced retardation layer was measured by AxoScan and found to be 126 nm (Example 1).

The cholesteric liquid crystal layer-forming coating liquid (B1) was applied to the surface of the obtained retardation layer at room temperature by using a wire bar so that the thickness of the dry film after drying was 0.3 μm, to obtain a coating layer.

The coating layer was dried at room temperature for 30 seconds and heated in an atmosphere of 85° C. for 2 minutes. Thereafter, in an environment with an oxygen concentration of 1000 ppm or less, a D bulb (90 mW/cm$^2$ lamp) manufactured by Fusion Co., Ltd. was used for irradiation with ultraviolet light at 60° C. and 60% output for 6 to 12 seconds to immobilize a cholesteric liquid crystalline phase, thereby obtaining a cholesteric liquid crystal layer B1 having a thickness of 0.3 μm.

Next, the same step was repeated using the cholesteric liquid crystal layer-forming coating liquid (G1) on a surface of the obtained cholesteric liquid crystal layer, and a cholesteric liquid crystal layer G1 having a thickness of 0.54 μm was laminated.

Next, the same step was repeated further using the cholesteric liquid crystal layer-forming coating liquid (R1) on a surface of the obtained cholesteric liquid crystal layer G1, and a cholesteric liquid crystal layer R1 having a thickness of 0.36 μm was laminated.

In this manner, a selective reflection layer including three cholesteric liquid crystal layers on the retardation layer was obtained. A reflection spectrum of the selective reflection layer was measured with a spectrophotometer (V-670, manufactured by JASCO Corporation), and as a result, a reflection spectrum satisfying the requirements (i) to (iii) was obtained. The graph illustrated in FIG. 2 is a reflection spectrum of the reflection film of Example 1.

Next, the polarization conversion layer-forming coating liquid illustrated in Table 2 was applied to a surface of the obtained cholesteric liquid crystal layer to form polarization conversion layers each of which has a target film thickness illustrated in Table 2, thereby producing a reflection film.

The polarization conversion layers were formed in the same manner as the cholesteric liquid crystal layer described above.

Examples 2 to 5 and Comparative Examples 1 to 7

In each of Examples and Comparative Examples, a reflection film was prepared in the same manner as in Example 1, except that the configuration of the cholesteric liquid crystal layer included in the light-reflection layer is changed to have a layer configuration illustrated in Table 3 below, and have a polarization conversion layer (or a retardation layer) illustrated in Table 2.

In Example 3, the cholesteric liquid crystal layers G6, R7, and IR4 were formed on a PET film having a thickness of 100 μm, the PET film was then peeled off, and the cholesteric liquid crystal layers G6, R7, and IR4 were laminated and bonded on the cholesteric liquid crystal layer B3 formed on the retardation layer, in this order, with OCA (manufactured by Nichiei Kako Co., Ltd.: MHM-UVC15, thickness 15 μm) to form a selective reflection layer.

In each of Comparative Examples 1 to 3, and 5, each cholesteric liquid crystal layer was formed on a PET film having a thickness of 100 μm, and the PET film was then peeled off, and the cholesteric liquid crystal layers were laminated and bonded with OCA (manufactured by Nichiei Kako Co., Ltd.: MHM-UVC15, thickness 15 μm) to form a selective reflection layer.

In each of Comparative Examples 1 to 3, ¼ wavelength plates (manufactured by TEIJIN LIMITED.: Pure Ace WR-S, retardation of 126 nm) were laminated and bonded on both surfaces of the selective reflection layer so that angles of slow axes were 45° and −45° to produce a reflection film.

In each of Comparative Examples 5 to 7, a polarization conversion layer was laminated and bonded onto one surface of the selective reflection layer, and a ¼ wavelength plate (manufactured by TEIJIN LIMITED.: Pure Ace WR-S) was laminated and bonded onto the other surface to produce a reflection film.

6 to 12 seconds to immobilize a cholesteric liquid crystalline phase, thereby obtaining a cholesteric liquid crystal layer C1.

A polarization conversion layer was formed on a surface of the formed cholesteric liquid crystal layer C1 in the same manner as in Example 1 to produce a reflection film.

TABLE 3

| | | Selective reflection layer | | | | Relationship between layers | Total thickness |
|---|---|---|---|---|---|---|---|
| Example 1 | Type | B1 | G1 | R1 | — | In contact with each other | 1.2 μm |
| | Selective reflection layer nm | 450 | 680 | 820 | — | | |
| | Thickness μm | 0.30 | 0.54 | 0.36 | — | | |
| Example 2 | Type | B1 | G2 | R2 | — | In contact with each other | 1.04 μm |
| | Selective reflection layer nm | 450 | 710 | 780 | — | | |
| | Thickness μm | 0.29 | 0.4 | 0.35 | — | | |
| Example 3 | Type | B3 | G6 | R7 | IR4 | Laminated and bonded | 5.63 μm |
| | Selective reflection layer nm | 450 | 550 | 655 | 740 | | |
| | Thickness μm | 0.93 | 1.3 | 1.7 | 1.7 | | |
| Example 4 | Type | B3 | G6 | R7 | IR4 | In contact with each other | 5.63 μm |
| | Selective reflection layer nm | 450 | 550 | 655 | 740 | | |
| | Thickness μm | 0.93 | 1.3 | 1.7 | 1.7 | | |
| Example 5 | Type | B1 | G3 | R3 | IR1 | In contact with each other | 2.25 μm |
| | Selective reflection layer nm | 450 | 600 | 760 | 820 | | |
| | Thickness μm | 0.43 | 0.7 | 0.5 | 0.62 | | |
| Comparative Example 1 | Type | B1 | G4 | R4 | IR2 | Laminated and bonded | 47 μm |
| | Selective reflection layer nm | 450 | 540 | 650 | 800 | | |
| | Thickness μm | 0.5 | 0.5 | 0.5 | 0.5 | | |
| Comparative Example 2 | Type | B2 | — | R5 | IR3 | Laminated and bonded | 31.6 μm |
| | Selective reflection layer nm | 481 | — | 613 | 843 | | |
| | Thickness μm | 0.4 | — | 0.55 | 0.65 | | |
| Comparative Example 3 | Type | B1 | G4 | R4 | IR2 | Laminated and bonded | 46.2 μm |
| | Selective reflection layer nm | 450 | 540 | 650 | 800 | | |
| | Thickness μm | 0.3 | 0.3 | 0.3 | 0.3 | | |
| Comparative Example 4 | Type | — | G5 | R2 | — | In contact with each other | 1.35 μm |
| | Selective reflection layer nm | — | 550 | 780 | — | | |
| | Thickness μm | — | 0.55 | 0.8 | — | | |
| Comparative Example 5 | Type | B1 | G1 | R6 | — | Laminated and bonded | 31.2 μm |
| | Selective reflection layer nm | 450 | 680 | 820 | — | | |
| | Thickness μm | 0.3 | 0.54 | 0.36 | — | | |
| Comparative Example 6 | Type | B1 | G4 | R4 | IR2 | In contact with each other | 2 μm |
| | Selective reflection layer nm | 450 | 540 | 650 | 800 | | |
| | Thickness μm | 0.5 | 0.5 | 0.5 | 0.5 | | |
| Comparative Example 7 | Type | B2 | — | R5 | IR3 | In contact with each other | 1.6 μm |
| | Selective reflection layer nm | 481 | — | 613 | 843 | | |
| | Thickness μm | 0.4 | — | 0.55 | 0.65 | | |

Example 6

In the formation of the cholesteric liquid crystal layer, a reflection film was produced in the same manner as in Example 1, except that the cholesteric liquid crystal layer C1 having a plurality of selective reflection center wavelengths was formed by using the above-described cholesteric liquid crystal layer-forming coating liquid C1 as follows.

The cholesteric liquid crystal layer-forming coating liquid C1 was applied to the surface of the retardation layer, which is formed on the support (alignment film) in the same manner as in Example 1, at room temperature by using a wire bar so that the thickness of the dry film after drying was 1.2 μm, to obtain a coating layer.

The obtained coating layer was irradiated with UV light of 365 nm at 30 mJ/cm$^2$ at room temperature under the atmosphere, and was heated at 85° C. atmosphere for 1 minute. Thereafter, the irradiation with UV light of 365 nm was carried out at 60 mJ/cm$^2$ at room temperature under the atmosphere, and heating was carried out 85° C. atmosphere for 1 minute. Thereafter, in an environment with an oxygen concentration of 1000 ppm or less, a D bulb (90 mW/cm$^2$ lamp) manufactured by Fusion Co., Ltd. was used for irradiation with ultraviolet light at 50° C. and 60% output for <Measurement of Reflection Spectrum>

The prepared reflection film was attached to the front surface of the glass plate, and a black PET film (light absorbing body) was attached to the back surface of the glass plate.

P-polarized light and S-polarized light were incident on the surface of the reflection film from a direction of 5° with respect to the normal direction, and each of reflection spectra of 400 nm to 1000 nm was measured with a spectrophotometer (V-670, manufactured by JASCO Corporation). The average value (average reflection spectrum) of the measured reflection spectrum of P-polarized light and the measured reflection spectrum of S-polarized light was obtained.

The average value between the reflectivity in a case where the P-polarized light was incident and the reflectivity in a case where the S-polarized light was incident is synonymous with the reflectivity in a case where the non-polarized light (natural light) was incident. That is, the average value of the reflection spectrum of P-polarized light and the reflection spectrum of S-polarized light has the same meaning as the reflection spectrum in the case where the natural light was incident.

From the calculated average value of the reflection spectra of P-polarized light and S-polarized light,
the maximum value of the natural light reflectivity in a band having a wavelength of 400 nm or more and less than 500 nm, a difference between the greatest maximum value and the smallest minimum value of the natural light reflectivity, and a wavelength bandwidth were calculated, the maximum value of the natural light reflectivity in a band having a wavelength of 500 nm or more and less than 600 nm, a difference between the greatest maximum value and the smallest minimum value of the natural light reflectivity, and a wavelength bandwidth were calculated, and the maximum value of the natural light reflectivity in a band having a wavelength of 600 nm to 800 nm and a wavelength bandwidth were calculated.

The wavelength bandwidth in the band having a wavelength of 400 nm or more and less than 500 nm has a width in a region where the reflectivity is higher than the average value of the maximum value and the minimum value of the reflectivity in the band having a wavelength of 400 nm or more and less than 500 nm.

In addition, the wavelength bandwidth in the band having a wavelength of 500 nm or more and less than 600 nm has a width in a region where the reflectivity is higher than the average value of the maximum value and the minimum value of the reflectivity in the band having a wavelength of 530 nm or more and less than 600 nm.

In addition, the wavelength bandwidth in the band having a wavelength of 600 nm or more 800 nm or less has a width in a region where the reflectivity is higher than the average value of the maximum value and the minimum value of the reflectivity in the band having a wavelength of 600 nm to 800 nm.

The measurement results are illustrated in Table 4.

TABLE 4

| | Band with wavelength of 400 nm or more and less than 500 nm | | | | | Band with wavelength of 500 nm or more and less than 600 nm |
| --- | --- | --- | --- | --- | --- | --- |
| | Maximum value of reflectivity [%] | Wavelength bandwidth [nm] | Wavelength having greatest maximum value [nm] | Wavelength having smallest minimum value [nm] | Difference between greatest maximum value and smallest minimum value [%] | Maximum value of reflectivity [%] |
| Example 1 | 14 | 73 | 485 | 401 | 5.6 | 16 |
| Example 2 | 16 | 39 | 457 | 439 | 4.1 | 18 |
| Example 3 | 16 | 55 | 440 | 478 | 8.6 | 17 |
| Example 4 | 18 | 55 | 450 | 486 | 9.8 | 19 |
| Example 5 | 18 | 42 | 450 | 480 | 5.3 | 20 |
| Example 6 | 14 | 75 | 485 | 401 | 5.0 | 16 |
| Comparative Example 1 | 23 | Without correspondence | Without correspondence | Without correspondence | Without correspondence | 25 |
| Comparative Example 2 | 16 | 50 | 420 | 450 | 1.5 | 19 |
| Comparative Example 3 | 12 | Without correspondence | Without correspondence | Without correspondence | Without correspondence | 13 |
| Comparative Example 4 | 14 | Without correspondence | Without correspondence | 430 | Without correspondence | 18 |
| Comparative Example 5 | 17 | Without correspondence | 430 | Without correspondence | Without correspondence | 16 |
| Comparative Example 6 | 28 | 52 | 490 | 408 | 15.2 | 25 |
| Comparative Example 7 | 14 | 40 | 474 | 412 | 7.3 | 22 |

| | Band with wavelength of 500 nm or more and less than 600 nm | | | | Band with wavelength of 600 nm or more and 800 nm or less | |
| --- | --- | --- | --- | --- | --- | --- |
| | Wavelength bandwidth [nm] | Wavelength having greatest maximum value [nm] | Wavelength having smallest minimum value [nm] | Difference between greatest maximum value and smallest minimum value [%] | Maximum value of reflectivity [%] | Wavelength bandwidth [nm] |
| Example 1 | 58 | 568 | 512 | 5.6 | 18 | 164 |
| Example 2 | 40 | 534 | 574 | 5.1 | 16 | 122 |
| Example 3 | 50 | 538 | 582 | 8.1 | 17 | 130 |
| Example 4 | 50 | 534 | 576 | 11.5 | 22 | 132 |
| Example 5 | 52 | 535 | 576 | 7.7 | 20 | 200 |
| Example 6 | 60 | 568 | 512 | 5.0 | 18 | 168 |
| Comparative Example 1 | 50 | 550 | 510 | 3.2 | 25 | 200 |
| Comparative Example 2 | 50 | 570 | 550 | 2.0 | 19 | 77 |
| Comparative Example 3 | 60 | 550 | 510 | 2.0 | 13 | 200 |
| Comparative Example 4 | 55 | 575 | 521 | 8.8 | 21 | 93 |
| Comparative Example 5 | Without correspondence | Without correspondence | 512 | Without correspondence | 17 | 128 |
| Comparative | Without | Without | Without | Without | 20 | 150 |

TABLE 4-continued

| | | | | | | |
|---|---|---|---|---|---|---|
| Example 6 | correspondence | correspondence | correspondence | correspondence | | |
| Comparative Example 7 | 60 | 588 | 534 | 7.0 | 16 | 98 |

<Production of Windshield Glass>

A windshield glass including each of the reflection films produced above was produced as follows.

As the first glass plate and the second glass plate, a first glass plate (manufactured by Central Glass Co., Ltd., FL2, visible light transmittance of 90%) having a length of 120 mm×a width of 100 mm, and a thickness of 2 mm was prepared.

In addition, a PVB film having a thickness of 0.38 mm manufactured by Sekisui Chemical Co., Ltd. was prepared as an interlayer film.

Furthermore, a heat seal layer was formed as follows.
<Production of Heat Seal Layer>
(Heat Seal Layer-Forming Coating Liquid)

The following components were mixed to prepare a heat seal layer-forming coating liquid.

| | |
|---|---|
| PVB sheet piece (manufactured by Sekisui Chemical Co., Ltd., ESLEK film) | 5.0 parts by mass |
| Methanol | 90.25 parts by mass |
| Butanol | 4.75 parts by mass |

(Formation of Heat Seal Layer)

A heat seal layer-forming coating liquid was applied to the reflection film (transparent substrate) with a wire bar, dried, and heat-treated at 50° C. for 1 minute to obtain a heat seal layer having a thickness of 1 μm.

In each Examples and Comparative Examples, the reflection film, the first glass plate, the second glass plate, the interlayer film, and the heat seal layer were laminated to have the configuration illustrated in Table 5 below, and this laminate was held at 90° C., 10 kPa (0.1 atm) for 1 hour, and then heated in an autoclave (manufactured by Kurihara Seisakusho Co., Ltd.) at 115° C., 1.3 MPa (13 atm) for 20 minutes to remove air bubbles, thereby obtaining a windshield glass.

TABLE 5

| | Configuration<br>Light is incident from right side |
|---|---|
| Example 1 | Second glass plate/heat seal layer/transparent substrate/retardation layer/selective reflection layer/polarization conversion layer/interlayer film/first glass plate |
| Example 2 | Second glass plate/interlayer film/polarization conversion layer/selective reflection layer/retardation layer/transparent substrate/heat seal layer/first glass plate |
| Example 3 | Second glass plate/heat seal layer/transparent substrate/retardation layer/selective reflection layer/polarization conversion layer/interlayer film/first glass plate |
| Example 4 | Second glass plate/heat seal layer/transparent substrate/retardation layer/selective reflection layer/polarization conversion layer/interlayer film/first glass plate |
| Example 5 | Second glass plate/heat seal layer/transparent substrate/retardation layer/selective reflection layer/polarization conversion layer/interlayer film/first glass plate |
| Example 6 | Second glass plate/heat seal layer/transparent substrate/retardation layer/selective reflection layer/polarization conversion layer/interlayer film/first glass plate |
| Comparative Example 1 | Second glass plate/interlayer film/retardation layer/selective reflection layer/retardation layer/interlayer film/first glass plate |
| Comparative Example 2 | Second glass plate/interlayer film/retardation layer/selective reflection layer/retardation layer/interlayer film/first glass plate |
| Comparative Example 3 | Second glass plate/interlayer film/retardation layer/selective reflection layer/retardation layer/interlayer film/first glass plate |
| Comparative Example 4 | Second glass plate/heat seal layer/transparent substrate/retardation layer/selective reflection layer/polarization conversion layer/interlayer film/first glass plate |
| Comparative Example 5 | Second glass plate/heat seal layer/transparent substrate/retardation layer/selective reflection layer/polarization conversion layer/interlayer film/first glass plate |
| Comparative Example 6 | Second glass plate/heat seal layer/transparent substrate/retardation layer/selective reflection layer/polarization conversion layer/interlayer film/first glass plate |
| Comparative Example 7 | Second glass plate/heat seal layer/transparent substrate/retardation layer/selective reflection layer/polarization conversion layer/interlayer film/first glass plate |

[Evaluation of Visible Light Transmittance]

The natural light was incident on the second glass plate side from the direction of 0° with respect to the normal direction of the second glass plate, and a transmittance spectrum was measured with a spectrophotometer (JASCO Corporation, V-670). According to JIS R 3106, the transmittance was calculated by multiplying the transmittance by each of a coefficient based on luminosity factor and an emission spectrum of a A light source in a wavelength range of 380 to 780 nm at intervals of 10 nm, and the transmittance was evaluated. The transmittance was evaluated according to the following evaluation standard.

Evaluation Standard for Transmittance
A: 82% or more (in a case where laminated glass is formed of green glasses, transmittance is sufficiently more than 70%)
B: 80% or more and less than 82% (in a case where laminated glass is formed of green glasses, transmittance is more than 70%, which satisfies the regulations, but manufacturing robustness is low)
C: less than 80% (in a case where laminated glass is formed of green glasses, transmittance is less than 70%, which does not meet the regulations)

[Evaluation of P-Polarized Light Reflectivity]

P-polarized light was caused to be incident from the direction of the angle of 65° with respect to the normal direction of the first glass plate from the first glass plate side, and the reflectivity spectrum of the specular reflection light (a direction 65° to the normal direction on the opposite side to the incident direction to the normal direction in the incident surface) is measured with a spectrophotometer (JASCO Corporation, V-670). In this case, the long side direction (machine direction) of the reflection film was made in parallel to the transmission axis of the incident P-polarized light of the spectrophotometer.

According to JIS R 3106, a projection image reflectivity was calculated by multiplying the reflectivity by a coefficient based on luminosity factor and an emission spectrum of the D65 light source in a wavelength range of 380 to 780 nm at intervals of 10 nm, and the projection image reflectivity was evaluated as brightness. The brightness was evaluated according to the following evaluation standard.

Evaluation Standard for P-polarized Light Reflectivity
A: 25% or more (an image can be seen by P-polarized light reflection system of HUD, and double images are less likely to be observed)
B: 20% or more and less than 25% (an image can be seen by P-polarized light reflection system of HUD, but double images are observed)
C: Less than 20% (an image is difficult to see clearly with the P-polarized light reflection system of HUD, and the double images can be observed well.)

[Evaluation of Reflection Tint]
The reflectivity of the natural light at incident angles of 5° and 60° were measured by the same method as that of the transmittance, and a* and b* of the reflection tint were calculated from the spectra thereof.

Evaluation Standard for Reflection Tint
AA: |a*|≤3 and |b*|≤3 (looks white in a case of projecting the white color)
A: |a*|≤5 and |b*|≤5 (excluding those corresponding to AA) (looks almost white in a case of projecting the white color)
B: |a*|≤7 and |b*|≤7 (excluding those corresponding to AA or A) (looks slightly tinted in a case of projecting the white color)
C: |a*|≤9 and |b*|<9 (excluding those corresponding to AA, A, or B) (looks being slightly tinted in a case of projecting the white color)
D: 9<|a*| or 9<|b*| (looks like different color in a case of projecting the white color)

The results are illustrated in Table 6.

TABLE 6

| | Evaluation | | | |
|---|---|---|---|---|
| | Visible light transmittance | P-polarized light reflectivity | Reflection tint 5° | Reflection tint 60° |
| Example 1 | A 82% | A 30% | AA | A |
| Example 2 | A 84% | A 26% | AA | A |
| Example 3 | B 80% | A 30% | A | A |
| Example 4 | B 80% | A 32% | AA | A |
| Example 5 | B 80% | A 33% | AA | AA |
| Example 6 | A 82% | A 30% | AA | A |
| Comparative Example 1 | C 72% | A 35% | AA | AA |
| Comparative Example 2 | C 77% | B 24% | AA | AA |
| Comparative Example 3 | A 82% | C 18% | AA | AA |
| Comparative Example 4 | A 82% | A 30% | D | A |
| Comparative Example 5 | A 83% | A 26% | C | A |
| Comparative Example 6 | C 75% | A 31% | B | C |
| Comparative Example 7 | B 80% | B 23% | D | B |

As illustrated in Table 6, it can be seen that in Examples of the present invention, favorable results were obtained in terms of visible light transmittance, P-polarized light reflectivity (brightness), and reflection tint, as compared with Comparative Examples.

In Comparative Example 1, the requirement (i) was not satisfied, and the natural light reflectivity was uniformly high, so that the visible light transmittance was low.

In Comparative Example 2, the requirements (i) to (iii) were not satisfied, and the difference between the greatest maximum value and the smallest minimum value of the natural light reflectivity in each of the requirements (i) and (ii) is less than 3%, and the total value of the wavelength bandwidths in the requirement (iii) was less than 120 nm, so that the visible light transmittance was low, and the P-polarized light reflectivity was low.

In Comparative Example 3, the requirements (i) and (ii) were not satisfied, and the difference between the greatest maximum value and the smallest minimum value of the natural light reflectivity in each of the requirements (i) and (ii) was less than 3%, so that the P-polarized light reflectivity was low.

In Comparative Example 4, the requirement (i) was not satisfied, and the total value of the wavelength bandwidths in the requirement (iii) was less than 120 nm, so that the reflection tint at an incident angle of 5° was poor.

In Comparative Example 5, the requirements (i) and (ii) were not satisfied, resulting in poor reflection tint at an incident angle of 5°.

In Comparative Example 6, the reflectivity in the requirement (i) was high, and the requirement (ii) was not satisfied, the visible light transmittance was low, and the reflection tint at an incident angle of 60° was poor.

In Comparative Example 7, the total value of the wavelength bandwidths in the requirement (iii) was less than 120 nm, so that the reflection tint at an incident angle of 5° was poor.

From the comparison between Examples 1 and 3, it can be seen that the cholesteric liquid crystal layer of the selective reflection layer was preferably in direct contact with each other.

From the comparison between Example 1, and Examples 4 and 5, it can be seen that the total thickness of the selective reflection layer is preferably 2.0 μm or less.

From Example 6, it can be seen that the cholesteric liquid crystal layer may have the plurality of selective reflection center wavelengths.

From the above results, the effect of the present invention is clearly exhibited.

The projection image display member can be suitably used for an in-vehicle head-up display system (HUD) or the like.

EXPLANATION OF REFERENCES

10: reflection film
12: selective reflection layer
12R, 12G, 12B: cholesteric liquid crystal layer
14: polarization conversion layer
16: retardation layer
18: transparent substrate
20: head-up display system (HUD)
22: projector
24: windshield glass
28: first glass plate
30: second glass plate
36: interlayer film
38: adhesive layer
D: driver
Y: vertical direction

What is claimed is:

1. A reflection film comprising:
a selective reflection layer formed of a cholesteric liquid crystal layer with a cholesteric liquid crystalline phase immobilized,
wherein the selective reflection layer satisfies all of requirements (i) to (iii),
  (i) in a wavelength range of 400 nm or more and less than 500 nm, a maximum value of a natural light reflectivity is 10% to 25%, a difference between a greatest maximum value and a smallest minimum value of the natural light reflectivity is 3% or more, and a total value of wavelength bandwidths in a region where a reflectivity is higher than an average value of the maximum value and the minimum value of the natural light reflectivity is 20 nm to 80 nm,
  (ii) in a wavelength range of 500 nm or more and less than 600 nm, a maximum value of a natural light reflectivity is 10% to 25%, a difference between a greatest maximum value and a smallest minimum value of the natural light reflectivity is 3% or more, and a total value of wavelength bandwidths in a region where a reflectivity is higher than an average value of the maximum value and the minimum value of the natural light reflectivity is 20 nm to 80 nm, and
  (iii) in a wavelength range of 600 nm or more and 800 nm or less, a maximum value of a natural light reflectivity is 10% to 25%, and a total value of wavelength bandwidths in a region where a reflectivity is higher than an average value of the maximum value and the minimum value of the natural light reflectivity is 120 nm or more.

2. The reflection film according to claim 1,
wherein the selective reflection layer includes two or more cholesteric liquid crystal layers having different selective reflection center wavelengths, and
the cholesteric liquid crystal layers are in contact with each other.

3. The reflection film according to claim 2,
wherein the selective reflection layer includes a cholesteric liquid crystal layer having two or more selective reflection center wavelengths.

4. The reflection film according to claim 2,
wherein a total thickness of the selective reflection layers is 0.4 μm to 2.0 μm.

5. The reflection film according to claim 2,
wherein the reflection film reflects linearly polarized light.

6. The reflection film according to claim 1,
wherein the selective reflection layer includes a cholesteric liquid crystal layer having two or more selective reflection center wavelengths.

7. The reflection film according to claim 1,
wherein a total thickness of the selective reflection layers is 0.4 μm to 2.0 μm.

8. The reflection film according to claim 1,
wherein the reflection film reflects linearly polarized light.

9. The reflection film according to claim 1, further comprising:
a retardation layer; and
a polarization conversion layer,
wherein the retardation layer, the selective reflection layer, and the polarization conversion layer are arranged in this order.

10. The reflection film according to claim 9,
wherein the polarization conversion layer has a helical alignment structure of a liquid crystal compound, which is immobilized, and
the number of pitches x of the helical alignment structure in the polarization conversion layer and a film thickness y (μm) of the polarization conversion layer satisfy all of Expression (a) to Expression (c), $$0.1 \leq x \leq 1.0 \quad \text{Expression (a)},$$

$$0.5 \leq y \leq 3.0 \quad \text{Expression (b)},$$

$$3000 \leq (1560xy)/x \leq 50000 \quad \text{Expression (c)}.$$

11. A windshield glass comprising, in the following order:
a first glass plate;
the reflection film according to claim 1; and
a second glass plate.

12. The windshield glass according to claim 11,
wherein each of the first glass plate and the second glass plate is curved glass, and
the reflection film and the second glass plate are provided on a convex side of the first glass plate.

13. The windshield glass according to claim 12,
wherein the reflection film includes a polarization conversion layer, and
the polarization conversion layer and the selective reflection layer are arranged in this order from the convex side of the first glass plate.

14. The windshield glass according to claim 12,
wherein the reflection film includes a retardation layer,
the retardation layer is arranged between the selective reflection layer and the second glass plate, and
the retardation layer has a front retardation of 50 nm to 160 nm at a wavelength of 550 nm, and has a slow axis at an angle of 10° to 50° or −50° to −10° in a case where a direction corresponding to an upper vertical direction of a surface of the first glass plate is set to 0°, with the windshield glass being mounted in a vehicle.

15. The windshield glass according to claim 12,
wherein the reflection film includes a transparent substrate, and
the transparent substrate is arranged on the second glass plate side.

16. The windshield glass according to claim 15,
wherein the transparent substrate contains an ultraviolet absorber.

17. A head-up display system comprising:
the windshield glass according to claim 12; and
a projector that emits projection light onto the first glass plate side of the windshield glass.

18. The head-up display system according to claim 17, wherein the projector emits p-polarized projection light.

19. The windshield glass according to claim 11, further comprising an interlayer film between the first glass plate and the reflection film.

20. The windshield glass according to claim 11, further comprising a heat seal layer between the reflection film and the second glass plate.

* * * * *